(12) United States Patent
Smith et al.

(10) Patent No.: US 9,409,292 B2
(45) Date of Patent: Aug. 9, 2016

(54) SERPENTINE ROBOTIC CRAWLER FOR PERFORMING DEXTEROUS OPERATIONS

(71) Applicant: Sarcos LC, Salt Lake City, UT (US)

(72) Inventors: Fraser M. Smith, Salt Lake City, UT (US); Marc Olivier, Salt Lake City, UT (US); John McCullough, Salt Lake City, UT (US)

(73) Assignee: Sarcos LC, Salt Lake City, UT (US)

( * ) Notice: Subject to any disclaimer, the term of this patent is extended or adjusted under 35 U.S.C. 154(b) by 0 days.

(21) Appl. No.: 14/026,284

(22) Filed: Sep. 13, 2013

(65) Prior Publication Data

US 2015/0081092 A1  Mar. 19, 2015

(51) Int. Cl.
| | | |
|---|---|---|
| *B25J 9/06* | (2006.01) | |
| *B25J 5/00* | (2006.01) | |
| *B25J 3/04* | (2006.01) | |
| *B25J 9/00* | (2006.01) | |
| *B25J 13/02* | (2006.01) | |

(52) U.S. Cl.
CPC .. *B25J 9/065* (2013.01); *B25J 3/04* (2013.01); *B25J 5/005* (2013.01); *B25J 5/007* (2013.01); *B25J 9/0087* (2013.01); *B25J 13/025* (2013.01); *Y10S 901/01* (2013.01); *Y10T 74/20329* (2015.01)

(58) Field of Classification Search
CPC ....................................................... B25J 9/065
See application file for complete search history.

(56) References Cited

U.S. PATENT DOCUMENTS

| | | | |
|---|---|---|---|
| 1,107,874 A | 8/1914 | Appleby | |
| 1,112,460 A | 10/1914 | Leavitt | |
| 1,515,756 A | 11/1924 | Roy | |
| 1,975,726 A | 10/1934 | Martinage | |
| 2,025,999 A | 12/1935 | Myers | |
| 2,082,920 A | 6/1937 | Aulmont | |
| 2,129,557 A | 9/1938 | Beach | |
| 2,311,475 A | 2/1943 | Schmeiser | |
| 2,312,072 A | 2/1943 | Broadwater | |
| 2,329,582 A | 9/1943 | Bishop | |
| 2,345,763 A | 4/1944 | Mayne | |
| 2,701,169 A | 2/1955 | Cannon | |

(Continued)

FOREIGN PATENT DOCUMENTS

| | | |
|---|---|---|
| CA | 2512299 | 9/2004 |
| CN | 1603068 | 4/2005 |

(Continued)

OTHER PUBLICATIONS

Arnold, Henry, "Cricket the robot documentation." online manual available at http://www.parallaxinc.com, 22 pages.

(Continued)

*Primary Examiner* — Khoi Tran
*Assistant Examiner* — Ryan Rink

(57) ABSTRACT

A serpentine robotic crawler having multiple dexterous manipulators supported about multiple frame units. The frame units are connected via an articulating linkage at proximal ends wherein the articulating linkage is capable of positioning the frames into various configurations. Dexterous manipulators are coupled to distal ends of the frame units and are positionable via the articulating linkage and articulating joints therein into various positions about the frame ends. The configurations and positioning of the dexterous manipulators allows the robotic crawler to perform coordinated dexterous operations.

26 Claims, 14 Drawing Sheets

(56) References Cited

U.S. PATENT DOCUMENTS

| | | |
|---|---|---|
| 2,850,147 A | 9/1958 | Hill |
| 2,933,143 A | 4/1960 | Robinson |
| 2,967,737 A | 1/1961 | Moore |
| 3,037,571 A | 6/1962 | Zelle |
| 3,060,972 A | 10/1962 | Sheldon |
| 3,107,643 A | 10/1963 | Edwards |
| 3,166,138 A | 1/1965 | Dunn, Jr. |
| 3,190,286 A | 6/1965 | Stokes |
| 3,215,219 A | 11/1965 | Forsyth |
| 3,223,462 A | 12/1965 | Dalrymple |
| 3,266,059 A | 8/1966 | Stelle |
| 3,284,964 A | 11/1966 | Saito |
| 3,311,424 A | 3/1967 | Taylor |
| 3,362,492 A | 1/1968 | Hansen |
| 3,387,896 A | 6/1968 | Sobota |
| 3,489,236 A | 1/1970 | Goodwin |
| 3,497,083 A | 2/1970 | Anderson |
| 3,565,198 A | 2/1971 | Ames |
| 3,572,325 A | 3/1971 | Bazell |
| 3,609,804 A | 10/1971 | Morrison |
| 3,650,343 A | 3/1972 | Helsell |
| 3,700,115 A | 10/1972 | Johnson |
| 3,707,218 A | 12/1972 | Payne |
| 3,712,481 A | 1/1973 | Harwood |
| 3,715,146 A | 2/1973 | Robertson |
| 3,757,635 A | 9/1973 | Hickerson |
| 3,808,078 A | 4/1974 | Snellman |
| 3,820,616 A | 6/1974 | Juergens |
| 3,841,424 A | 10/1974 | Purcell |
| 3,864,983 A | 2/1975 | Jacobsen |
| 3,933,214 A | 1/1976 | Guibord |
| 3,934,664 A | 1/1976 | Pohjola |
| 3,974,907 A | 8/1976 | Shaw |
| 4,015,553 A | 4/1977 | Meddleton |
| 4,051,914 A | 10/1977 | Pohjola |
| 4,059,315 A | 11/1977 | Jolliffe |
| 4,068,905 A | 1/1978 | Black |
| 4,107,948 A | 8/1978 | Maolaug |
| 4,109,971 A | 8/1978 | Black |
| 4,132,279 A | 1/1979 | Van der Lende |
| 4,218,101 A | 8/1980 | Thompson |
| 4,260,053 A | 4/1981 | Onodera |
| 4,332,317 A | 6/1982 | Bahre |
| 4,332,424 A | 6/1982 | Thompson |
| 4,339,031 A | 7/1982 | Densmore |
| 4,393,728 A | 7/1983 | Larson |
| 4,396,233 A | 8/1983 | Slaght |
| 4,453,611 A | 6/1984 | Stacy, Jr. |
| 4,483,407 A | 11/1984 | Iwamoto et al. |
| 4,489,826 A | 12/1984 | Dubson |
| 4,494,417 A | 1/1985 | Larson |
| 4,551,061 A | 11/1985 | Olenick |
| 4,589,460 A | 5/1986 | Albee |
| 4,621,965 A | 11/1986 | Wilcock |
| 4,636,137 A | 1/1987 | Lemelson |
| 4,646,906 A | 3/1987 | Wilcox, Jr. |
| 4,661,039 A | 4/1987 | Brenhold |
| 4,671,774 A | 6/1987 | Owen |
| 4,700,693 A | 10/1987 | Lia |
| 4,706,506 A | 11/1987 | Lestelle |
| 4,712,969 A | 12/1987 | Kimura |
| 4,713,896 A | 12/1987 | Jennens |
| 4,714,125 A | 12/1987 | Stacy, Jr. |
| 4,727,949 A | 3/1988 | Rea |
| 4,736,826 A | 4/1988 | White et al. |
| 4,752,105 A | 6/1988 | Barnard |
| 4,756,662 A | 7/1988 | Tanie |
| 4,765,795 A | 8/1988 | Rebman |
| 4,784,042 A | 11/1988 | Paynter |
| 4,796,607 A | 1/1989 | Allred, III |
| 4,806,066 A | 2/1989 | Rhodes |
| 4,815,319 A | 3/1989 | Clement |
| 4,815,911 A | 3/1989 | Bengtsson |
| 4,818,175 A | 4/1989 | Kimura |
| 4,828,339 A | 5/1989 | Thomas |
| 4,828,453 A | 5/1989 | Martin et al. |
| 4,848,179 A | 7/1989 | Ubhayakar |
| 4,862,808 A | 9/1989 | Hedgecoxe |
| 4,878,451 A | 11/1989 | Siren |
| 4,900,218 A | 2/1990 | Sutherland |
| 4,909,341 A | 3/1990 | Rippingale |
| 4,924,153 A | 5/1990 | Toru et al. |
| 4,932,491 A | 6/1990 | Collins, Jr. |
| 4,932,831 A | 6/1990 | White et al. |
| 4,936,639 A | 6/1990 | Pohjola |
| 4,997,790 A | 3/1991 | Woo |
| 5,018,591 A | 5/1991 | Price |
| 5,021,798 A | 6/1991 | Ubhayakar |
| 5,022,812 A | 6/1991 | Coughlan |
| 5,046,914 A | 9/1991 | Holland et al. |
| 5,080,000 A | 1/1992 | Bubic |
| 5,130,631 A | 7/1992 | Gordon |
| 5,142,932 A | 9/1992 | Moya |
| 5,172,639 A | 12/1992 | Wiesman et al. |
| 5,174,168 A | 12/1992 | Takagi |
| 5,174,405 A | 12/1992 | Carra |
| 5,186,526 A | 2/1993 | Pennington |
| 5,199,771 A | 4/1993 | James |
| 5,205,612 A | 4/1993 | Sugden et al. |
| 5,214,858 A | 6/1993 | Pepper |
| 5,219,264 A | 6/1993 | McClure et al. |
| 5,252,870 A | 10/1993 | Jacobsen |
| 5,297,443 A | 3/1994 | Wentz |
| 5,317,952 A | 6/1994 | Immega |
| 5,337,732 A | 8/1994 | Grundfest |
| 5,337,846 A | 8/1994 | Ogaki et al. |
| 5,350,033 A | 9/1994 | Kraft |
| 5,354,124 A | 10/1994 | James |
| 5,363,935 A | 11/1994 | Schempf |
| 5,386,741 A | 2/1995 | Rennex |
| 5,413,454 A | 5/1995 | Movsesian |
| 5,426,336 A | 6/1995 | Jacobsen |
| 5,428,713 A | 6/1995 | Matsumaru |
| 5,435,405 A | 7/1995 | Schempf |
| 5,440,916 A | 8/1995 | Stone et al. |
| 5,443,354 A | 8/1995 | Stone et al. |
| 5,451,135 A | 9/1995 | Schempf |
| 5,465,525 A | 11/1995 | Mifune |
| 5,466,056 A | 11/1995 | James |
| 5,469,756 A | 11/1995 | Feiten |
| 5,516,249 A | 5/1996 | Brimhall |
| 5,519,814 A | 5/1996 | Rodriguez et al. |
| 5,551,545 A | 9/1996 | Gelfman |
| 5,556,370 A | 9/1996 | Maynard |
| 5,562,843 A | 10/1996 | Yasumoto |
| 5,567,110 A | 10/1996 | Sutherland |
| 5,570,992 A | 11/1996 | Lemelson |
| 5,573,316 A | 11/1996 | Wankowski |
| 5,588,688 A | 12/1996 | Jacobsen |
| 5,672,044 A | 9/1997 | Lemelson |
| 5,697,285 A | 12/1997 | Nappi |
| 5,712,961 A | 1/1998 | Matsuo |
| 5,749,828 A | 5/1998 | Solomon |
| 5,770,913 A | 6/1998 | Mizzi |
| 5,816,769 A | 10/1998 | Bauer |
| 5,821,666 A | 10/1998 | Matsumoto |
| 5,842,381 A | 12/1998 | Feiten |
| 5,845,540 A | 12/1998 | Rosheim |
| RE36,025 E | 1/1999 | Suzuki |
| 5,878,783 A | 3/1999 | Smart |
| 5,888,235 A | 3/1999 | Jacobsen |
| 5,902,254 A | 5/1999 | Magram |
| 5,906,591 A | 5/1999 | Dario |
| 5,984,032 A | 11/1999 | Gremillion |
| 5,996,346 A | 12/1999 | Maynard |
| 6,016,385 A | 1/2000 | Yee |
| 6,030,057 A | 2/2000 | Fikse |
| 6,056,237 A | 5/2000 | Woodland |
| 6,107,795 A | 8/2000 | Smart |
| 6,109,705 A | 8/2000 | Courtemanche |
| 6,113,343 A | 9/2000 | Goldenberg et al. |
| 6,132,133 A | 10/2000 | Muro et al. |
| 6,138,604 A | 10/2000 | Anderson |
| 6,162,171 A | 12/2000 | Ng |

(56) References Cited

U.S. PATENT DOCUMENTS

| | | |
|---|---|---|
| 6,186,604 B1 | 2/2001 | Fikse |
| 6,203,126 B1 | 3/2001 | Harguth |
| 6,232,735 B1 | 5/2001 | Baba et al. |
| 6,260,501 B1 | 7/2001 | Agnew |
| 6,263,989 B1 | 7/2001 | Won |
| 6,264,293 B1 | 7/2001 | Musselman |
| 6,264,294 B1 | 7/2001 | Musselman et al. |
| 6,272,396 B1 | 8/2001 | Taitler |
| 6,281,489 B1 | 8/2001 | Tubel et al. |
| 6,323,615 B1 | 11/2001 | Khairallah |
| 6,325,749 B1 | 12/2001 | Inokuchi et al. |
| 6,333,631 B1 | 12/2001 | Das et al. |
| 6,339,993 B1 | 1/2002 | Comello |
| 6,380,889 B1 | 4/2002 | Herrmann et al. |
| 6,394,204 B1 | 5/2002 | Haringer |
| 6,405,798 B1 | 6/2002 | Barrett et al. |
| 6,408,224 B1 | 6/2002 | Okamoto |
| 6,411,055 B1 | 6/2002 | Fujita |
| 6,422,509 B1 | 7/2002 | Yim |
| 6,430,475 B2 | 8/2002 | Okamoto |
| 6,431,296 B1 | 8/2002 | Won |
| 6,446,718 B1 | 9/2002 | Barrett et al. |
| 6,450,104 B1 | 9/2002 | Grant |
| 6,477,444 B1 | 11/2002 | Bennett et al. |
| 6,484,083 B1 | 11/2002 | Hayward |
| 6,488,306 B1 | 12/2002 | Shirey et al. |
| 6,505,896 B1 | 1/2003 | Boivin |
| 6,512,345 B2 | 1/2003 | Borenstein |
| 6,522,950 B1 | 2/2003 | Conca et al. |
| 6,523,629 B1 | 2/2003 | Buttz |
| 6,529,806 B1 | 3/2003 | Licht |
| 6,535,793 B2 | 3/2003 | Allard |
| 6,540,310 B1 | 4/2003 | Cartwright |
| 6,557,954 B1 | 5/2003 | Hattori |
| 6,563,084 B1 | 5/2003 | Bandy |
| 6,574,958 B1 | 6/2003 | Macgregor |
| 6,576,406 B1 | 6/2003 | Jacobsen et al. |
| 6,595,812 B1 | 7/2003 | Haney |
| 6,610,007 B2 | 8/2003 | Belson |
| 6,619,146 B2 | 9/2003 | Kerrebrock |
| 6,636,781 B1 | 10/2003 | Shen et al. |
| 6,651,804 B2 | 11/2003 | Thomas |
| 6,652,164 B2 | 11/2003 | Stiepel et al. |
| 6,668,951 B2 | 12/2003 | Won |
| 6,708,068 B1 | 3/2004 | Sakaue |
| 6,715,575 B2 | 4/2004 | Karpik |
| 6,725,128 B2 | 4/2004 | Hogg et al. |
| 6,772,673 B2 | 8/2004 | Seto |
| 6,773,327 B1 | 8/2004 | Felice |
| 6,774,597 B1 | 8/2004 | Borenstein |
| 6,799,815 B2 | 10/2004 | Krishnan |
| 6,820,653 B1 | 11/2004 | Schempf |
| 6,831,436 B2 | 12/2004 | Gonzalez |
| 6,835,173 B2 | 12/2004 | Couvillon, Jr. |
| 6,837,318 B1 | 1/2005 | Craig |
| 6,840,588 B2 | 1/2005 | Deland |
| 6,866,671 B2 | 3/2005 | Tierney |
| 6,870,343 B2 | 3/2005 | Borenstein |
| 6,889,118 B2 | 5/2005 | Murray et al. |
| 6,917,176 B2 | 7/2005 | Schempf |
| 6,923,693 B2 | 8/2005 | Borgen |
| 6,936,003 B2 | 8/2005 | Iddan |
| 6,959,231 B2 | 10/2005 | Maeda |
| 6,971,141 B1 | 12/2005 | Tak |
| 7,017,687 B1 | 3/2006 | Jacobsen et al. |
| 7,020,701 B1 | 3/2006 | Gelvin et al. |
| 7,040,426 B1 | 5/2006 | Berg |
| 7,044,245 B2 | 5/2006 | Anhalt et al. |
| 7,069,124 B1 | 6/2006 | Whittaker et al. |
| 7,090,637 B2 | 8/2006 | Dankitz |
| 7,137,465 B1 | 11/2006 | Kerrebrock |
| 7,144,057 B1 | 12/2006 | Young et al. |
| 7,171,279 B2 | 1/2007 | Buckingham et al. |
| 7,188,473 B1 | 3/2007 | Asada |
| 7,188,568 B2 | 3/2007 | Stout |
| 7,228,203 B2 | 6/2007 | Koselka et al. |
| 7,235,046 B2 * | 6/2007 | Anhalt et al. ................ 600/142 |
| 7,331,436 B1 | 2/2008 | Pack et al. |
| 7,387,179 B2 | 6/2008 | Anhalt et al. |
| 7,415,321 B2 | 8/2008 | Okazaki et al. |
| 7,475,745 B1 | 1/2009 | DeRoos |
| 7,539,557 B2 | 5/2009 | Yamauchi |
| 7,546,912 B1 | 6/2009 | Pack et al. |
| 7,597,162 B2 | 10/2009 | Won |
| 7,597,762 B2 | 10/2009 | Albanese et al. |
| 7,600,592 B2 | 10/2009 | Goldenberg et al. |
| 7,645,110 B2 | 1/2010 | Ogawa et al. |
| 7,654,348 B2 | 2/2010 | Ohm et al. |
| 7,762,362 B2 * | 7/2010 | Cutkosky et al. ............. 180/8.5 |
| 7,775,312 B2 | 8/2010 | Maggio |
| 7,798,264 B2 | 9/2010 | Hutcheson et al. |
| 7,843,431 B2 | 11/2010 | Robbins et al. |
| 7,845,440 B2 * | 12/2010 | Jacobsen ...................... 180/9.46 |
| 7,860,614 B1 | 12/2010 | Reger |
| 7,865,266 B2 | 1/2011 | Moll et al. |
| 7,874,386 B2 * | 1/2011 | Ben-Tzvi et al. .............. 180/9.1 |
| 7,974,736 B2 | 7/2011 | Morin et al. |
| 8,002,365 B2 | 8/2011 | Jacobsen |
| 8,002,716 B2 | 8/2011 | Jacobsen |
| 8,042,630 B2 * | 10/2011 | Jacobsen ...................... 180/9.46 |
| 8,162,410 B2 | 4/2012 | Hirose et al. |
| 8,185,241 B2 * | 5/2012 | Jacobsen ...................... 700/250 |
| 8,205,695 B2 | 6/2012 | Jacobsen et al. |
| 8,225,892 B2 * | 7/2012 | Ben-Tzvi ...................... 180/9.1 |
| 8,317,555 B2 | 11/2012 | Jacobsen et al. |
| 8,392,036 B2 | 3/2013 | Jacobsen |
| 8,393,422 B1 * | 3/2013 | Pensel .......................... 180/9.46 |
| 8,571,711 B2 * | 10/2013 | Jacobsen et al. ............. 700/247 |
| 9,031,698 B2 | 5/2015 | Smith |
| 2001/0037163 A1 | 11/2001 | Allard |
| 2002/0038168 A1 | 3/2002 | Kasuga et al. |
| 2002/0128714 A1 | 9/2002 | Manasas et al. |
| 2002/0140392 A1 | 10/2002 | Borenstein |
| 2002/0189871 A1 | 12/2002 | Won |
| 2003/0000747 A1 | 1/2003 | Sugiyama |
| 2003/0069474 A1 | 4/2003 | Couvillon, Jr. |
| 2003/0097080 A1 | 5/2003 | Esashi |
| 2003/0110938 A1 | 6/2003 | Seto |
| 2003/0223844 A1 | 12/2003 | Schiele |
| 2004/0030571 A1 | 2/2004 | Solomon |
| 2004/0099175 A1 | 5/2004 | Perrot et al. |
| 2004/0103740 A1 | 6/2004 | Townsend |
| 2004/0168837 A1 | 9/2004 | Michaud |
| 2004/0216931 A1 | 11/2004 | Won |
| 2004/0216932 A1 | 11/2004 | Giovanetti |
| 2005/0007055 A1 | 1/2005 | Borenstein |
| 2005/0027412 A1 | 2/2005 | Hobson |
| 2005/0085693 A1 | 4/2005 | Belson et al. |
| 2005/0107669 A1 | 5/2005 | Couvillon, Jr. |
| 2005/0115337 A1 | 6/2005 | Tarumi |
| 2005/0166413 A1 | 8/2005 | Crampton |
| 2005/0168068 A1 | 8/2005 | Courtemanche et al. |
| 2005/0168070 A1 | 8/2005 | Dandurand |
| 2005/0225162 A1 | 10/2005 | Gibbins |
| 2005/0235898 A1 | 10/2005 | Hobson |
| 2005/0235899 A1 | 10/2005 | Yamamoto |
| 2005/0288819 A1 | 12/2005 | de Guzman |
| 2006/0000137 A1 | 1/2006 | Validvia y Alvarado |
| 2006/0005733 A1 | 1/2006 | Rastegar et al. |
| 2006/0010702 A1 | 1/2006 | Roth |
| 2006/0010998 A1 | 1/2006 | Lloyd |
| 2006/0070775 A1 | 4/2006 | Anhalt |
| 2006/0117324 A1 | 6/2006 | Alsafadi et al. |
| 2006/0156851 A1 | 7/2006 | Jacobsen |
| 2006/0225928 A1 | 10/2006 | Nelson |
| 2006/0229773 A1 | 10/2006 | Peretz |
| 2006/0290779 A1 | 12/2006 | Reverte et al. |
| 2007/0029117 A1 | 2/2007 | Goldenberg et al. |
| 2007/0156286 A1 | 7/2007 | Yamauchi |
| 2007/0193790 A1 | 8/2007 | Goldenberg et al. |
| 2007/0260378 A1 | 11/2007 | Clodfelter |
| 2007/0289786 A1 | 12/2007 | Cutkosky et al. |
| 2007/0293989 A1 | 12/2007 | Norris |
| 2008/0115687 A1 | 5/2008 | Gal et al. |

(56) References Cited

U.S. PATENT DOCUMENTS

| | | |
|---|---|---|
| 2008/0136254 A1 | 6/2008 | Jacobsen |
| 2008/0164079 A1 | 7/2008 | Jacobsen |
| 2008/0167662 A1 | 7/2008 | Kurtz |
| 2008/0167752 A1 | 7/2008 | Jacobsen |
| 2008/0168070 A1 | 7/2008 | Naphade |
| 2008/0192569 A1 | 8/2008 | Ray et al. |
| 2008/0215185 A1 | 9/2008 | Jacobsen |
| 2008/0217993 A1 | 9/2008 | Jacobsen |
| 2008/0272647 A9 | 11/2008 | Hirose et al. |
| 2008/0281231 A1 | 11/2008 | Jacobsen |
| 2008/0281468 A1 | 11/2008 | Jacobsen |
| 2008/0284244 A1 | 11/2008 | Hirose et al. |
| 2009/0025988 A1 | 1/2009 | Jacobsen et al. |
| 2009/0030562 A1 | 1/2009 | Jacobsen |
| 2009/0035097 A1 | 2/2009 | Loane |
| 2009/0095209 A1 | 4/2009 | Jamieson |
| 2009/0132088 A1 | 5/2009 | Taitler |
| 2009/0171151 A1 | 7/2009 | Choset et al. |
| 2009/0212157 A1 | 8/2009 | Arlton et al. |
| 2009/0248202 A1* | 10/2009 | Osuka et al. ............. 700/245 |
| 2010/0030377 A1 | 2/2010 | Unsworth |
| 2010/0036544 A1 | 2/2010 | Mashiach |
| 2010/0174422 A1 | 7/2010 | Jacobsen |
| 2010/0201185 A1 | 8/2010 | Jacobsen |
| 2010/0201187 A1 | 8/2010 | Jacobsen |
| 2010/0228548 A1 | 9/2010 | Liu et al. |
| 2010/0258365 A1 | 10/2010 | Jacobsen |
| 2010/0268470 A1 | 10/2010 | Kamal et al. |
| 2010/0317244 A1 | 12/2010 | Jacobsen |
| 2010/0318242 A1 | 12/2010 | Jacobsen et al. |
| 2012/0072019 A1 | 3/2012 | Sanders et al. |
| 2012/0185095 A1 | 7/2012 | Rosenstein et al. |
| 2012/0205168 A1 | 8/2012 | Flynn et al. |
| 2012/0264414 A1 | 10/2012 | Fung |
| 2012/0277914 A1 | 11/2012 | Crow et al. |
| 2012/0292120 A1* | 11/2012 | Ben-Tzvi ................. 180/9.1 |
| 2013/0054021 A1 | 2/2013 | Murai et al. |
| 2014/0121835 A1 | 5/2014 | Smith |
| 2015/0081092 A1 | 3/2015 | Jacobsen |
| 2015/0127150 A1 | 5/2015 | Ponulak et al. |
| 2015/0127155 A1 | 5/2015 | Passot et al. |

FOREIGN PATENT DOCUMENTS

| | | |
|---|---|---|
| CN | 2774717 | 4/2006 |
| CN | 1970373 | 5/2007 |
| CN | 101583820 | 5/2011 |
| DE | 3025840 | 2/1982 |
| DE | 3626238 | 2/1988 |
| DE | 3626328 | 2/1988 |
| DE | 19617852 | 10/1997 |
| DE | 19714464 | 10/1997 |
| DE | 19704080 | 8/1998 |
| DE | 10018075 | 1/2001 |
| DE | 102004010089 | 9/2005 |
| EP | 0105418 | 4/1984 |
| EP | 0584520 | 3/1994 |
| EP | 0818283 | 1/1998 |
| EP | 0924034 | 6/1999 |
| EP | 1444043 | 8/2004 |
| EP | 1510896 | 3/2005 |
| EP | 1832501 | 9/2007 |
| EP | 1832502 | 9/2007 |
| EP | 2081814 | 7/2009 |
| EP | 2082159 | 7/2009 |
| EP | 2170683 | 4/2010 |
| EP | 2444006 A2 | 4/2012 |
| EP | 2549165 A1 | 1/2013 |
| EP | 2092265 | 4/2013 |
| FR | 2638813 | 5/1990 |
| FR | 2660730 | 10/1991 |
| FR | 2609335 A1 | 7/1998 |
| FR | 2850350 | 7/2004 |
| GB | 1199729 | 7/1970 |
| JP | S50-108110 A | 8/1975 |
| JP | S51-106391 A | 9/1976 |
| JP | 52 57625 | 5/1977 |
| JP | S52-122431 | 9/1977 |
| JP | S58-032870 | 2/1983 |
| JP | 58-89480 | 5/1983 |
| JP | S58-80387 U | 5/1983 |
| JP | S59-139494 U | 9/1984 |
| JP | 60015275 | 1/1985 |
| JP | S60-047771 A | 3/1985 |
| JP | 60060516 | 4/1985 |
| JP | 60139576 | 7/1985 |
| JP | SHO 60-211315 | 10/1985 |
| JP | S61-001581 | 1/1986 |
| JP | SHO 61-180885 | 1/1986 |
| JP | S61-020484 U | 2/1986 |
| JP | SHO61-054378 | 3/1986 |
| JP | SHO61-075069 | 4/1986 |
| JP | 61089182 | 5/1986 |
| JP | S61-260988 | 11/1986 |
| JP | SHO 62-36885 | 3/1987 |
| JP | 62165207 | 7/1987 |
| JP | 62-162626 | 10/1987 |
| JP | S61-51353 | 10/1987 |
| JP | S63-32084 | 3/1988 |
| JP | S63-501208 A | 5/1988 |
| JP | S63-170174 A | 7/1988 |
| JP | 63306988 | 12/1988 |
| JP | H02-109691 A | 4/1990 |
| JP | H03-007388 | 1/1991 |
| JP | H03-104572 | 5/1991 |
| JP | 04092784 | 3/1992 |
| JP | 4126656 A | 4/1992 |
| JP | H05-003087 | 1/1993 |
| JP | H05-069350 | 3/1993 |
| JP | 05147560 | 6/1993 |
| JP | HEI05-270454 | 10/1993 |
| JP | H05-286460 A | 11/1993 |
| JP | 06-115465 | 4/1994 |
| JP | 2007-216936 | 8/1995 |
| JP | 7329841 | 12/1995 |
| JP | H07-329837 | 12/1995 |
| JP | H08-133141 | 5/1996 |
| JP | H08-133151 A | 5/1996 |
| JP | H09-109069 | 4/1997 |
| JP | H09-109070 | 4/1997 |
| JP | H09-142347 | 6/1997 |
| JP | H10-277976 | 10/1998 |
| JP | H11-277466 A | 10/1999 |
| JP | H11-347970 | 12/1999 |
| JP | 2001-010560 | 1/2001 |
| JP | 2001-195113 | 7/2001 |
| JP | 2003-019985 | 1/2003 |
| JP | 2003-237618 A | 8/2003 |
| JP | 2003/315486 A | 11/2003 |
| JP | 2003-334783 | 11/2003 |
| JP | 2004/080147 A | 3/2004 |
| JP | 03535508 | 6/2004 |
| JP | 2004-536634 | 12/2004 |
| JP | 2005-19331 | 1/2005 |
| JP | 2005-081447 | 3/2005 |
| JP | 2005-111595 A | 4/2005 |
| JP | 2005111595 | 4/2005 |
| JP | 2005-169561 | 6/2005 |
| JP | 2006-510496 | 3/2006 |
| JP | 2006-107024 | 4/2006 |
| JP | 2006-173782 | 6/2006 |
| JP | 2007-237991 | 9/2007 |
| JP | 2010-509129 | 3/2010 |
| JP | 2012-187698 | 10/2012 |
| JP | 2013-010165 | 1/2013 |
| JP | 2013-091114 | 5/2013 |
| WO | WO 87/02635 | 5/1987 |
| WO | WO 96/37727 | 11/1996 |
| WO | WO97/26039 | 7/1997 |
| WO | WO 00/10073 | 2/2000 |
| WO | WO00/10073 | 2/2000 |
| WO | WO02/16995 | 2/2002 |
| WO | WO 02/095517 | 11/2002 |

(56) References Cited

FOREIGN PATENT DOCUMENTS

| | | |
|---|---|---|
| WO | WO03/030727 | 4/2003 |
| WO | WO03037515 | 5/2003 |
| WO | WO 2004/056537 | 7/2004 |
| WO | WO2005/018428 | 3/2005 |
| WO | WO 2006/068080 | 6/2006 |
| WO | WO 2008/049050 | 4/2008 |
| WO | WO 2008/073203 | 6/2008 |
| WO | WO 2008/076194 | 6/2008 |
| WO | WO 2008/127310 A2 | 10/2008 |
| WO | WO 2008/135978 | 11/2008 |
| WO | WO 2009/009673 | 1/2009 |
| WO | WO 2010/070666 | 6/2010 |
| WO | WO 2012/061932 | 5/2012 |

OTHER PUBLICATIONS

Ijspeert et al; From Swimming to Walking with a Salamander Robot Driven by a Spinal Cord Model; Science; Mar. 2007; pp. 1416-1419; vol. 315; American Association for the Advancement of Science.

Paap et al., "A robot snake to inspect broken buildings," IEEE, 2000, pp. 2079-2082, Japan.

Braure, Jerome, "Participation to the construction of a salamander robot: exploration of the morphological configuration and the locomotion controller", Biologically Inspired Robotics Group, master thesis, Feb. 17, 2004, pp. 1-46.

Jacobsen, et al., Advanced intelligent mechanical sensors (AIMS), Proc. IEEE Trandsucers 1991, Jun. 24-27, abstract only, San Fransico, CA.

Jacobsen, et al., "Research robots for applications in artificial intelligence, teleoperation and entertainment", International Journal of Robotics Research, 2004, pp. 319-330, vol. 23.

Berlin et al., "MEMS-based control of structural dynamic instability", Journal of Intelligent Material Systems and Structures, Jul. 1998 pp. 574-586, vol. 9.

Goldfarb, "Design and energetic characterization of a liquid-propellant-powered actuator for self-powered robots," IEEE Transactions on Mechatronics, Jun. 2003, vol. 8 No. 2.

Dowling, "Limbless Locomotion: Learning to crawl with a snake robot," The Robotics Institute at Carnegie Mellon University, Dec. 1997, pp. 1-150.

NASA: "Nasa's newest concept vehicles take off-roading out of this world" Internet article, Nov. 5, 2008, http://www.nasa.gov/mission_pages/constellation/main/lunar_truck.html.

Revue Internationale De defense, "3-D vision and urchin" Oct. 1, 1988, p. 1292, vol. 21, No. 10, Geneve CH.

Advertisement, International Defense review, Jane's information group, Nov. 1, 1990, p. 54, vol. 23, No. 11, Great Britain.

Ren Luo "Development of a multibehavior-based mobile robot for remote supervisory control through the internet" IEEE/ ASME Transactions on mechatronics, IEEE Service Center, Piscataway, NY, Dec. 1, 2000, vol. 5, No. 4.

Nilas Sueset et al., "A PDA-based high-level human-robot interaction" Robotics, Automation and Mechatronics, IEEE Conference Singapore, Dec. 1-3, 2004, vol. 2, pp. 1158-1163.

Mahabatra et al; "Design and Implementation of Coordinated Multipurpose Robotic System with RF and Light Communication Channels"; Paper entirely based on study, research and experiments.

Simmons et al; "Coordinated Deployment of Multiple, Heterogeneous Robots"; School of Computer Science, Carnegie Mellon University, Pittsburgh PA.; Honeywell Technology Center, Minneapolis, MN; Intelligent Robot Systems, 2000; vol. 3 pp. 2254-2260.

Blackburn, et al.; Improved mobility in a multi-degree-of-freedom unmanned ground vehicle; *Unmanned Ground Vehicles Technology VI*; Sep. 2, 2004; 124-134; Proceedings of SPIE vol. 5422.

Schenker, et al.; Reconfigurable robots for all terrain exploration; Jet Propulsion Laboratory, California Institute of Technology; 2000; 15 pages.

Hutchison et al.; Development of Control for a Serpentine Robot; Proceedings of the 7th IEEE International Symposium on Computational Intelligence in Robotics and Automation (CIRA2007); Jun. 2007; 6 pages; Jacksonville, FL.

PCT Application PCT/US10/38331; filed Jun. 11, 2009; Stephen C. Jacobsen; international search report issued Dec. 1, 2010.

PCT Application PCT/US2010/038339; filing date Jun. 11, 2010; Stephen C. Jacobsen; international search report mailed Feb. 9, 2011.

PCT Application PCT/US2013/042739; filed May 24, 2013; Raytheon Company; international search report dated Aug. 21, 2013.

PCT Application PCT/US2013/067840; filing date Oct. 31, 2013; Raytheon Company; international search report mailed Aug. 29, 2014.

PCT Application PCT/US2014//055673; filing date Sep. 15, 2014; Raytheon Company; international search report mailed Jun. 25, 2015.

EP Application 08826145.8; filing date Jul. 10, 2008; Raytheon Company; European Search Report dated Apr. 5, 2013.

U.S. Appl. No. 12/171,144, filed Jul. 10, 2008; Stephen C. Jacobsen; office action issued Aug. 11, 2010.

U.S. Appl. No. 12/694,996, filed Jan. 27, 2010; Stephen C. Jacobsen; office action issued Sep. 30, 2010.

U.S. Appl. No. 11/985,324, filed Nov. 13, 2007; Stephen C. Jacobsen; office action issued Nov. 1, 2010.

U.S. Appl. No. 12/151,730, filed May 7, 2008; Stephen C. Jacobsen; office action issued Nov. 15, 2010.

U.S. Appl. No. 12/820,881, filed Jun. 22, 2010; Stephen C. Jacobsen; office action issued Nov. 30, 2010.

U.S. Appl. No. 12/765,618, filed Apr. 22, 2010; Stephen C. Jacobsen; office action issued Apr. 6, 2011.

U.S. Appl. No. 11/985,320, filed Nov. 13, 2007; Stephen C. Jacobsen; office action issued Apr. 12, 2011.

U.S. Appl. No. 11/985,336, filed Nov. 13, 2007; Stephen C. Jacobsen; office action issued Jun. 14, 2011.

U.S. Appl. No. 12/350,693, filed Jan. 8, 2009; Stephen C. Jacobsen; office action issued Oct. 12, 2011.

U.S. Appl. No. 11/985,320, filed Nov. 13, 2007; Stephen C. Jacobsen; office action issued Nov. 25, 2011.

U.S. Appl. No. 12/814,302, filed Jun. 11, 2010; Stephen C. Jacobsen; office action issued Jan. 10, 2012.

U.S. Appl. No. 12/171,146, filed Jul. 10, 2008; Stephen C. Jacobsen; office action issued Feb. 9, 2012.

U.S. Appl. No. 12/350,693, filed Jan. 8, 2009; Stephen C. Jacobsen; office action issued Mar. 28, 2012.

U.S. Appl. No. 13/181,380, filed Jul. 12, 2011; Stephen C. Jacobsen; office action dated Jul. 17, 2012.

U.S. Appl. No. 12/171,146, filed Jul. 10, 2008; Stephen C. Jacobsen; office action dated Aug. 20, 2012.

U.S. Appl. No. 12/814,304, filed Jun. 11, 2010; Stephen C. Jacobsen; office action dated Nov. 13, 2012.

U.S. Appl. No. 12/117,233, filed May 8, 2008; Stephen C. Jacobsen; office action dated Nov. 23, 2012.

U.S. Appl. No. 12/117,233, filed May 8, 2008; Stephen C. Jacobsen; office action dated Aug. 15, 2013.

U.S. Appl. No. 12/814,304, filed Jun. 11, 2010; Stephen C. Jacobsen; office action dated Oct. 24, 2013.

U.S. Appl. No. 12/814,304, filed Jun. 11, 2010; Stephen C. Jacobsen; office action dated May 22, 2014.

U.S. Appl. No. 13/665,669, filed Oct. 31, 2012; Fraser M. Smith; office action dated Jul. 7, 2014.

U.S. Appl. No. 14/196,951, filed Mar. 4, 2014; Fraser M. Smith; office action dated Jun. 1, 2015.

U.S. Appl. No. 12/151,730, filed May 7, 2008; Stephen C. Jacobsen; notice of allowance issued Apr. 15, 2011.

U.S. Appl. No. 11/985,324, filed Nov. 13, 2007; Stephen C. Jacobsen; notice of allowance issued Apr. 18, 2011.

U.S. Appl. No. 12/820,881, filed Jun. 22, 2010; Stephen C. Jacobsen; notice of allowance issued Jun. 9, 2011.

U.S. Appl. No. 11/985,336, filed Nov. 13, 2007; Stephen C. Jacobsen; notice of allowance issued Jan. 19, 2012.

U.S. Appl. No. 12/765,618, filed Apr. 22, 2010; Stephen C. Jacobsen; notice of allowance issued Feb. 2, 2012.

U.S. Appl. No. 12/814,302, filed Jun. 11, 2010; Stephen C. Jacobsen; notice allowance dated Jul. 25, 2012.

U.S. Appl. No. 12/350,693, filed Jan. 8, 2009; Stephen C. Jacobsen; notice allowance dated Sep. 20, 2012.

(56) References Cited

OTHER PUBLICATIONS

U.S. Appl. No. 13/481,631, filed May 25, 2012; Ralph W. Pensel; notice of allowance dated Sep. 24, 2012.
U.S. Appl. No. 13/181,380, filed Jul. 12, 2011; Stephen C. Jacobsen; notice of allowance dated Dec. 24, 2012.
U.S. Appl. No. 12/171,146, filed Jul. 10, 2008; Stephen C. Jacobsen; notice of allowance dated Jun. 24, 2013.
U.S. Appl. No. 12/814,304, filed Jun. 11, 2010; Stephen C. Jacobsen; notice of allowance mailed Sep. 10, 2014.
U.S. Appl. No. 13/665,669, filed Oct. 31, 2012; Fraser Smith.
U.S. Appl. No. 14/026,284, filed Sep. 13, 2013; Stephen C. Jacobsen.
U.S. Appl. No. 14/196,951, filed Mar. 4, 2014; Fraser Smith.
Arnold, Henry, "Cricket the robot documentation." online manual available at http://www.parallaxinc.com, upon knowledge and belief prior to Jan. 2012, 22 pages.
Iagnemma, Karl et al., "Traction control of wheeled robotic vehicles in rough terrain with application to planetary rovers." International Journal of Robotics Research, Oct.-Nov. 2004, pp. 1029-1040, vol. 23, No. 10-11.
Hirose, et al., "Snakes and strings; new robotic components for rescue operations," International Journal of Robotics Research, Apr.-May 2004, pp. 341-349, vol. 23, No. 4-5.
Paap et al., "A robot snake to inspect broken buildings," IEEE, Oct.-Nov. 2000, pp. 2079-2082, Japan.
Braure, Jerome, "Participation to the construction of a salamander robot: exploration of the morphological configuration and the locomotion controller", Biologically Inspired Robotics Group, master thesis, Feb. 17, 2014, pp. 1-46.
Jacobsen, et al., "Research robots for applications in artificial intelligence, teleoperation and entertainment", International Journal of Robotics Research, Apr.-May 2004, pp. 319-330, vol. 23.
Jacobsen, et al., "Multiregime MEMS sensor networks for smart structures," Procs. SPIE 6th Annual Inter. Conf. on Smart Structures and Materials, Mar. 1-5, 1999, pp. 19-32, vol. 3673, Newport Beach CA.
MacLean et al., "A digital MEMS-based strain gage for structural health monitoring," Procs. 1997 MRS Fall Meeting Symposium, Nov. 30-Dec. 4, 1997, pp. 309-320, Boston Massachusetts.
Goldfarb, "Design and energetic characterization of a liquid-propellant-powered actuator for self-powered robots," IEEE Transactions on Mechatronics, Jun. 2003, pp. 254-262, vol. 8 No. 2.
Dowling, "Limbless Locomotion: Learning to crawl with a snake robot," The Robotics Institute at Carnegie Mellon Univesity, Dec. 1997, pp. 1-144.
Matthew Heverly & Jaret Matthews: "A wheel-on-limb rover for lunar operation" Internet article, Nov. 5, 2008, pp. 1-8, http://robotics.estec.esa.int/i-SAIRAS/isairas2008/Proceedings/SESSION%2026/m116-Heverly.pdf.
NASA: "Nasa's newest concept vehicles take off-roading out of this world" Internet article, Nov. 5, 2008, 5 pages, http://www.nasa.gov/mission_pages/consellation/main/lunar_truck.html.
Ren Luo "Development of a multibehavior-based mobile robot for remote supervisory control through the internet" IEEE/ ASME Transactions on mechatronics, IEEE Service Center, Piscataway, NY, Dec. 1, 2000, pp. 376-385, vol. 5, No. 4.
Nilas et al., "A PDA-based high-level human-robot interaction" Robotics, Automation and Mechatronics, IEEE Conference Singapore, Dec. 1-3, 2004, vol. 2, pp. 1158-1163.
Mehling et al; A Minimally Invasive Tendril Robot for In-Space Inspection; Feb. 2006; The First IEEE/RAS-EMBS International Conference on Biomedical Robotics and Biomechatronics (BioRob '06) p. 690-695.
Celaya et al.; Control of a Six-Legged Robot Walking on Abrupt Terrain; Proceedings of the 1996 IEE International Conference on Robotics and Automation, Minneapolis, Minnesota; Apr. 1996; 6 pages.
Van Der Burg et al.; Anti-Lock Braking and Traction Control Concept for All-Terrain Robotic Vehicles; Proceedings of the 1997 IIEE International Conference on Robotics and Automation; Albuquerque, New Mexico; Apr. 1997; 6 pages.
Akin et al, "MORPHbots: Lightweight Modular Self Reconfigurable Robotics for Space Assembly, Inspection, and Servicing", Space, Sep. 2006, 11 pages, University of Maryland.

\* cited by examiner

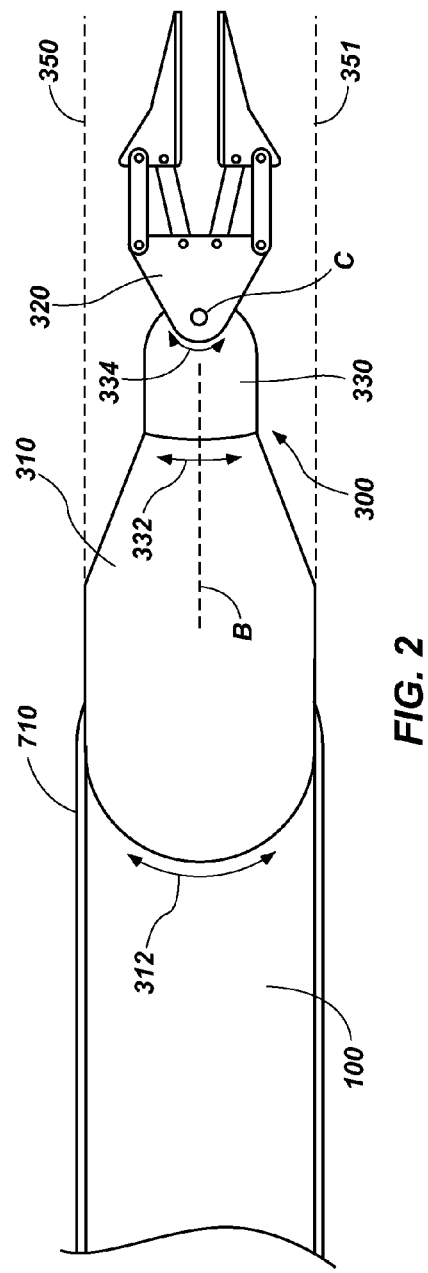
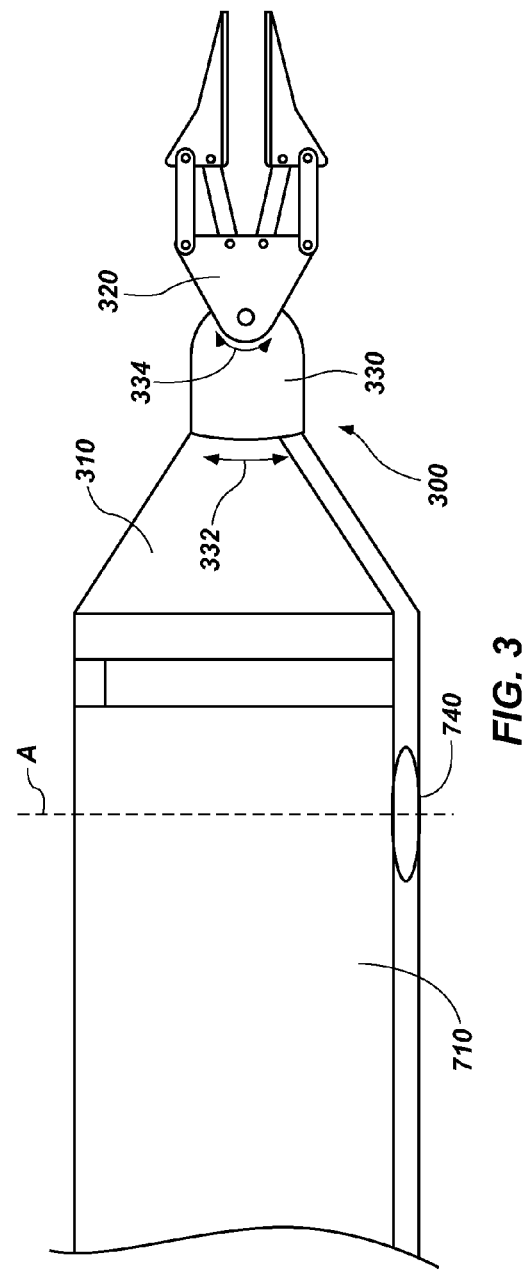
FIG. 2
FIG. 3

SERPENTINE ROBOTIC CRAWLER FOR PERFORMING DEXTEROUS OPERATIONS

BACKGROUND

Robotics is an active area of research, and many different types of robotic vehicles have been developed for various tasks. For example, unmanned aerial vehicles have been quite successful in military aerial reconnaissance. Recently, there has been much advancement in the field of unmanned ground vehicles. These unmanned ground vehicles vary widely and are adapted to traverse a wide variety of terrain, including for example, loose and shifting materials, obstacles, vegetation, limited width or height openings, steps, and the like.

A vehicle optimized for operation in one environment may perform poorly in other environments. For example, large vehicles can handle some obstacles better, including for example steps, drops, gaps, and the like. On the other hand, large vehicles cannot easily negotiate narrow passages or crawl inside pipes, and are more easily deterred by vegetation. Large vehicles also tend to be more readily spotted, and thus are less desirable for discrete surveillance applications. In contrast, while small vehicles are more discrete and can negotiate certain paths better than larger vehicles, surmounting certain obstacles can be a greater navigational challenge.

A variety of mobility configurations within robotic vehicles have been adapted to traverse difficult terrain. These options include legs, wheels, and tracks. Legged robots can be agile, but such systems can require complex control mechanisms to move and achieve stability. Wheeled vehicles can provide high mobility, but can provide limited traction and can require more overall robot width in order to achieve stability.

Tracked vehicles are known and have traditionally been configured in a tank-like configuration. While tracked vehicles can provide a high degree of stability in some environments, tracked vehicles typically provide limited maneuverability when employed on small vehicles. Furthermore, known tracked vehicles are unable to accommodate a wide variety of obstacles, particularly when the terrain is narrow and the paths are tortuous and winding.

A further limitation of ground vehicles is that of negotiating or manipulating complex obstacles. Manipulation of complex obstacles such as twisting a doorknob, or climbing the rungs of a ladder, climbing fences (e.g., chain link fences, etc.) become insurmountable to a simple legged robot or a wheeled or tracked robot. A reconnaissance drone operating on the ground would be unable to enter a closed door, climb a ladder, climb a fence or enter a pass code on a keypad. Known unmanned ground vehicles are currently unable to perform a wide variety of tasks, particularly when the task requires controlled manipulation of an object or controlled force balancing in multiple directions.

BRIEF DESCRIPTION OF THE DRAWINGS

The present invention will become more fully apparent from the following description and appended claims, taken in conjunction with the accompanying drawings. Understanding that these drawings merely depict exemplary embodiments of the present invention they are, therefore, not to be considered limiting of its scope. It will be readily appreciated that the components of the present invention, as generally described and illustrated in the figures herein, can be arranged and designed in a wide variety of different configurations. Nonetheless, the invention will be described and explained with additional specificity and detail through the use of the accompanying drawings in which:

FIGS. 2 and 3 illustrate respective partial side and top views of the serpentine robotic crawler of FIG. 1, and particularly a frame unit and an associated dexterous manipulator coupled to the distal end in accordance with an embodiment of the present invention;

DETAILED DESCRIPTION

Figure 1:
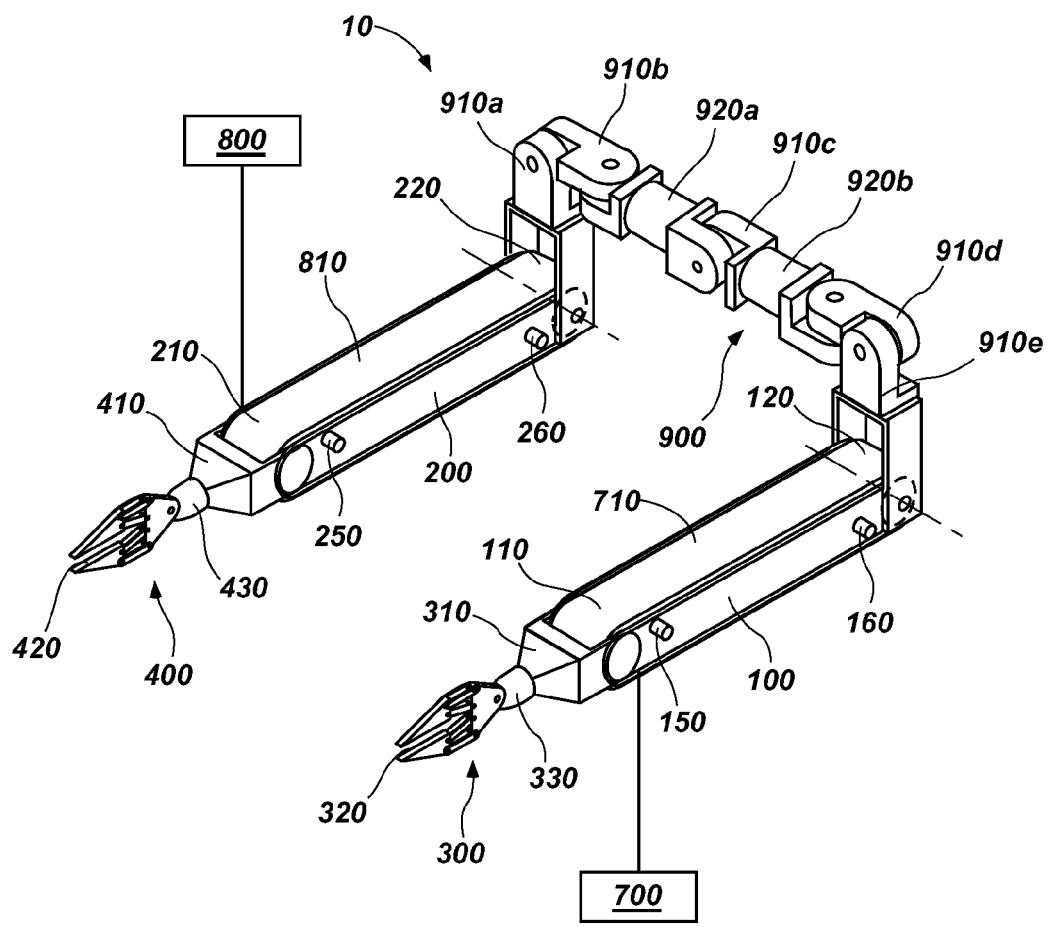
FIG. 1 illustrates a perspective view of a serpentine robotic crawler having multiple (two) dexterous manipulators in accordance with one exemplary embodiment of the present invention.

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

There are a variety of different types of unmanned robots used for surveillance, reconnaissance, and remote operations, many of which are remote controlled or autonomous. These robots vary in design and functionality from recreational battle robots to robots capable of collecting samples such as NASA's mars rover. The largest problem encountered by the design teams for these robots is the ability of the robot to traverse different types of terrain. Indeed, the designs to traverse terrain vary widely. An inherent problem lies in the fact that robots able to traverse the widest variety of terrain types while also able to transport instruments and tools tend to be large and cumbersome. Large robots, while good at traversing a variety of types of terrain are severely limited from entering and functioning in confined spaces. A further limitation is the ability of known robots to overcome, manipulate or otherwise operate on complex obstacles, such as grasping and manipulating an object, climbing a structure, etc.

The present invention includes a serpentine robotic crawler having dexterous manipulators which help to overcome some of the problems and deficiencies inherent in the prior art as discussed above. In one embodiment, the serpentine robotic crawler includes at least one positionable dexterous manipulator. The at least one dexterous manipulator can be attached to a frame having a continuous track rotatably supported therein. A serpentine robotic crawler having multiple dexterous manipulators is also contemplated. In this case, first and second dexterous manipulators can be supported about first and second frames, respectively, which can be coupled together by an articulated linkage capable of positioning the first and second frames in one of several available positions to allow each of the dexterous manipulators attached to the respective frames to perform a variety of operations. In one sense, this articulation and positioning allows the serpentine robotic crawler to assume or to be configured into a low profile configuration, such as for the purpose of entering into, and passing through, confined or small spaces. For example the crawler could climb through a drain pipe to enter a room. Upon entering the room the crawler may be reconfigured into a working position, such as in a position to bring the dexterous manipulators together to perform a dexterous task or operation (i.e. open a valve handle, climb a ladder, climb a rope or cable, type on a keyboard, hold an object using one end-effector and perform dexterous manipulation on part of the object using a second end-effector attached to the serpentine robotic crawler, or numerous other types of dexterous tasks or operations).

As used herein, the term "dexterous operation" is defined as an operation capable of being carried out by the dexterous manipulator, such as with the end effector of the dexterous manipulator, in which forces are applied by the end effector (e.g., in different directions (e.g., opposing directions)) to act upon or against an object or thing.

As used herein, the term "dexterous manipulator" is defined as the component or arrangement of components operable within the robotic crawler to provide or carry out a dexterous operation.

As used herein, the term "dexterous manipulation system" can mean the system comprising the dexterous manipulator coupled with a control system (e.g., processor, electronics, circuitry, filters, hydraulics, actuators, motors, control logic, etc.) used to control the dexterous manipulator.

As used herein, the term "coordinated dexterous operation" means operation of at least two dexterous manipulators to perform one or more dexterous operations to facilitate performance of one or more tasks. This may include the dexterous manipulators being coordinated to perform the same single dexterous operation to accomplish the one or more tasks. This may also include the dexterous manipulators being coordinated to perform different, but related dexterous operations to accomplish the one or more tasks. This may also include the dexterous manipulators being coordinated to perform different, and unrelated dexterous operations to accomplish the one or more tasks. This may also include positioning of the dexterous manipulators by the frame(s) and/or the articulating linkage in a position to perform the dexterous operation.

As used herein, the term "drive subsystem" is defined as elements located on the frame units which give the crawler locomotive abilities. Such elements may include, but are not limited to, a ground contacting element (e.g., endless track, wheels, combination of these, etc.), a drive train, if any, a transmission, if any, a motor, a power source, or any other elements necessary to effect movement of the robotic crawler about a ground or other surface or structure.

The following detailed description and exemplary embodiments of the invention will be best understood by reference to the accompanying drawings, wherein the elements and features of the invention are designated by numerals throughout.

With reference to FIGS. 1-3, shown is an illustration of a serpentine robotic crawler with dexterous manipulators according to a first exemplary embodiment of the present invention. Specifically, FIG. 1 illustrates an isometric view of a serpentine robotic crawler 10 which can include a plurality of dexterous manipulators that can be positioned and articulated to perform dexterous operations in a variety of situations, some of which will be discussed in detail below.

As shown, a first dexterous manipulator 300 can be coupled about a distal end 110 of a first frame 100, and a second dexterous manipulator 400 can be coupled about a distal end 210 of a second frame 200. Frames 100, 200 can comprise a distal end 110 and 210, respectively, and a proximal end 120 and 220, respectively. The serpentine robotic crawler can further comprise a propulsion system configured to cause the frames 100 and 200 to move about a ground or other surface, and relative to one another, such as to achieve different configurations and propulsion modes. The propulsion system can comprise a drive subsystem 700, which can be supported about and operable with frame 100, and a similar drive subsystem 800, which can be supported about and operable with frame 200. The drive subsystems may include various motors, drive trains, controls, etc. The propulsion system may further comprise one or more surface contacting elements that facilitate propulsion of the serpentine robotic crawler, such as a continuous or endless track 710 rotatably supported about frame 100 operable with drive subsystem 700, and continuous or endless track 810 rotatably supported about frame 200 and operable with drive subsystem 800. Addition of the rotatable endless tracks 710 and 810 to their respective frame units provides mobility to the serpentine robotic crawler 10 in a way that allows the serpentine robotic crawler 10 to move about the ground or other surfaces, and to overcome numerous obstacles. Other types of surface contacting elements may be employed, as will be recognized by those skilled in the art, such as wheels, rotating joints, etc., each of which are contemplated herein.

The robotic serpentine device 10 can further comprise a multiple degree of freedom linkage arm 900 coupling together the frames 100 and 200 at or near proximal ends 120 and 220 of each respective frame 100 and 200. In one exemplary embodiment, the multiple degree of freedom linkage arm 900 can be moveable relative to frames 100 and 200. Movement of the multiple degree of freedom linkage arm 900 can be passive, actuated, or braked. In the embodiment shown, the multiple degree of freedom linkage arm 900 can include pivoting articulating joints 910*a-e* and rotating articulating joints 920*a-b*. All or some of these articulating joints 910*a-e* and 920*a-b* can be actuatable to achieve selective positioning of the joints relative to one another and the frames 100, 200. Indeed, the articulating joints can facilitate the serpentine robotic crawler 10 assuming a variety of configurations and positioning of the first and second frames 100, 200 relative to one another, and also the first dexterous manipulator 300 relative to the second dexterous manipulator 400. As in the exemplary configuration shown in FIG. 1, the serpentine robotic crawler 10 can assume a tank-like configuration having the frames 100, 200 and the rotatable endless tracks 710 and 810 in a side-by-side arrangement with each other. In other situations, the serpentine robotic crawler 10 can assume alternative configurations, such as configuration with the frame units in a tandem relationship relative to one another. These different configurations are discussed in more detail below.

Frame units 100 and 200 may each be equipped with stops 160 and 260, respectively, or other limiter devices or systems, which may limit the degree of rotation of the multiple degree of freedom linkage arm 900, such that the joints coupled to frames 100 and 200 are prohibited from rotating to such a degree that the joints interfere with the operation of the endless tracks 120 and 220.

The dexterous manipulators 300 and 400 may each comprise respective jointed members 310 and 410 pivotally connected or coupled to or otherwise about the distal ends 110 and 210 of frames 100 and 200, respectively. The jointed members 310 and 410 can help facilitate the dexterous manipulators 300, 400 being capable of operating or functioning in a wrist-like manner, meaning to move in multiple degrees of freedom about multiple different axes similar to the human wrist.

One or both of the dexterous manipulators 300 and 400 can further comprise an end effector (e.g., see end effectors 320 and 420 operable with jointed members 310 and 410, respectively) configured to operate on or manipulate, or otherwise interface with a workpiece (e.g., an object, another end effector, the ground or other surface, etc). Essentially, the dexterous manipulators 300 and 400, with their end effectors 320 and 420, respectively, can be configured to manipulate or otherwise interface with an object or thing for the purpose of performing a dexterous operation.

The end effectors 300, 400 can comprise a variety of different configurations, depending upon the task to be performed. For example, the end effectors can be designed to comprise components operable to apply two opposing forces on a workpiece giving it some functionality similar to a human hand. In one aspect, such as in the embodiment shown, the end effectors may comprise opposing finger components that move relative to one another, and that are configured to apply opposing forces in a direction towards one another, or to constrict, similar to a human finger against an opposable thumb. In another aspect, the end effectors may comprise components configured to be operated to apply counter or opposing forces in a direction away from one another, or to expand. Various end effectors will be discussed in more detail below in regard to FIGS. 5*a-h*.

The unique positioning capabilities of the frames and articulating linkage of the serpentine robotic crawler, along with the jointed members 310 and 410 in conjunction with their respective end effectors 320 and 420, facilitates dynamic positioning of the serpentine robotic crawler, and more particularly its dexterous manipulators 300, 400, relative to one or more given work pieces, and/or relative to each other. Further, similar to the stops 160 and 260 between the multiple degree of freedom linkage arm 900, stops 150 and 250 may be affixed to respective frames 100 and 200 in order to ensure that the jointed members 310 and 410 do not interfere with respective rotating endless tracks 710 and 810.

To provide additional dexterity to, and to facilitate enhanced positioning and capabilities of, the dexterous manipulators 300 and 400, one or both of the dexterous manipulators 300 and 400 may further comprise a rotational joint, such as rotational joints 330 and 430, operable with the jointed members 210, 310 and the end effectors 320, 420, respectively, to allow the dexterous manipulators 300, 400 to function in a wrist-like manner having multiple degrees of freedom (e.g., to provide pitch, yaw and roll functionality to or as imparted to the end effector). Each of the rotational joints 330 and 430 can be rotatably coupled to the jointed members 210, 310 and configured to rotate (i.e., twist) back and forth within a full 360 degrees about the end of jointed members 310, 410, respectively about axis B. Additionally, rotational joints 330 and 430 may also be configured such that they may rotate continuously, i.e. they may be able to perform infinite continuous and successive complete revolutions in a first or clockwise direction as well as in an opposing, second or counterclockwise direction. Further, each end effector 320 and 420 may be pivotally coupled to the rotational joints 330 and 430, respectively, and configured to pivot in a bi-directional manner within a range (e.g., 0-360 degrees; 0-180 degrees, etc. as measured about axis B, and depending upon the design and configuration of the dexterous manipulator and the various joints therein). The various degrees of freedom provided by the jointed members, the rotational joints and the end effector, as operably coupled together, as well as the various degrees of freedom within the articulated linkage allow the dexterous manipulators 300, 400, and particularly the end effectors 320 and 420, to be positioned in virtually any orientation with respect to their respective frames 100, 200 and a workpiece, or with respect to each other.

The various components of the serpentine robotic crawler can be actively articulated or passively articulated. For example, in one exemplary embodiment, dexterous manipulators 300 and 400, as well as the various joints making up the multiple degree of freedom linkage arm 900, may be actively actuated using servo motors, driveshaft systems, chain drive systems, hydraulic systems, tendon/pulley type systems, or any other suitable actuation means as will be recognized by those skilled in the art. Alternatively, the dexterous manipulators 300,400, as well as the various joints in the multiple degree of freedom linkage arm 900, may be operated using one or more types of passive systems, such as braking systems, locking systems, or any other suitable system capable of maintaining these in a locked position. These active or passive articulation systems can operate to facilitate positioning of the various movable joints of each respective dexterous manipulator 300 and 400, as well as the multiple degree of freedom arm 900 to place the dexterous manipulators 300, 400 in a desired or needed position.

It should be noted that for the particular embodiment shown in FIG. 1, the configurations and features described in relation to frame 100 and associated dexterous manipulator 300 can be similarly applicable to frame 200 and its associated dexterous manipulator 400. Nonetheless, frame 200 and dexterous manipulator 300 can be configured differently, such as to employ varying end effectors, wrists and jointed members, as those skilled in the art will appreciate, which different configurations are contemplated herein.

With reference to FIGS. 2 and 3, shown is a more detailed portion of the serpentine robotic crawler 10 of FIG. 1, namely the frame 100 and the corresponding dexterous manipulator 300 coupled to and operable therewith. For various applications where a minimal or low profile would be desired it may be advantageous to design and configure the articulating linkage (see articulating linkage 900 of FIG. 1), the dexterous manipulator 300, including jointed member 310, rotational joint 330, and the end effector 320 so as to be capable of being positioned completely within an upper plane 350 and a lower plane 351 defined by the uppermost and lowermost surfaces of the serpentine robotic crawler, in this case the upper and lower surfaces of the endless track 710.

This configuration allows the serpentine crawler 10 to, at least temporarily, assume a low profile configuration or operating mode for a given purpose, such as to enter into tight or constricted spaces or areas or to access areas through such constricted spaces, where it may later be reconfigured into an operating mode with the various components caused to be positioned without or outside of these planes (where space permits) to perform a dexterous operation. For example, being configured into a low profile configuration would allow the robotic crawler 10 to access an area through a drain pipe, a hole in a wall, etc. This ability to assume this low profile position and enter a confined space and then expand itself into a multidirectional working position provides the serpentine robotic crawler 10 an advantage in performing coordinated dexterous operations that may not otherwise be possible.

Although the serpentine robotic crawler 10 may certainly be configured to assume a low profile configuration, this is certainly not intended to be limiting in any way as such a configuration may not be necessary. For example, in some situations there may be no space restrictive areas on the approach to an area where a dexterous operation is to be performed. As such, the present invention contemplates any type of robotic device having at least two dexterous manipulators capable of performing a dexterous operation. A specific serpentine type robotic device is therefore not meant or intended to be limiting in any way.

As indicated above, the dexterous manipulator 300 can be configured to provide movement in multiple degrees of freedom relative to the frame 100 to which it is coupled. In the embodiment shown, the dexterous manipulator 300 can provide movement about three degrees of freedom. Specifically, the dexterous manipulator 300 can provide rotation 312 of jointed member 310 about axis A, rotation 332 of the rotational joint 330 about axis B, and the rotation 334 of the rotational joint 330 about axis C (into page). However, this is not meant to be limiting in any way as the dexterous manipulator 300 can be configured with a variety of joints and joint configurations to enable more or less degrees of freedom than shown specifically herein.

FIG. 3 illustrates the ability of the rotational joint 330 to rotate the end effector 320 through a 360 degree range of motion, noting that the end effector in this view is rotated from the view of FIG. 2.

Figure 4:
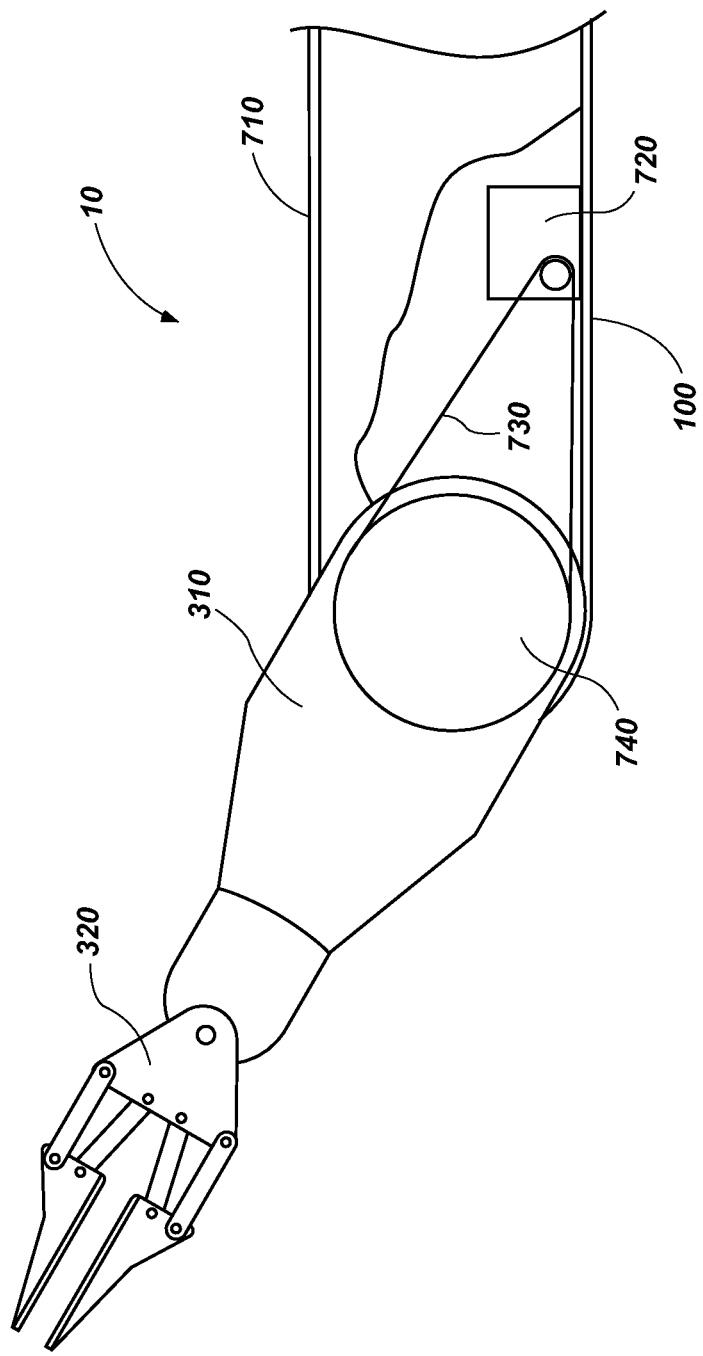
FIG. 4 illustrates a partial side view of the serpentine robotic crawler of FIG. 1, and particularly a frame having a partial cutaway portion showing one type of actuating system and method used to actuate the jointed member in relation to the frame in accordance with an embodiment of the present invention.

With reference to FIG. 4, shown is a portion of the serpentine robotic crawler 10. Specifically, FIG. 4 shows a partial cutaway of frame 100 in order to illustrate an exemplary method for actuating the jointed member 310. In this embodiment, a reversible motor 720 operates to turn a drive belt 730 and subsequently a rotatable drive cylinder 740 to which the jointed member 310 is affixed. Upon activation of the motor 720, the jointed member 310 is caused to move in a corresponding direction, thus manipulating the position of the end effector 320 about the frame 100. As those skilled in the art will recognize, this type of actuation system and method is not intended to be limiting in any way, but merely depicts one of many systems and methods that can be employed for actuating the jointed member 310. For instance, additional active actuation systems and methods can comprise or employ hydraulic actuators, servo motors, pneumatic devices, transmissions, or any others or their combination. Further, as mentioned, in other embodiments passive actuation methods are contemplated, such as braking cylinders, locks, or other passive actuation systems and methods or their combination (these can also be combined with an active actuation system and method).

With reference to FIG. 5A-H, shown are illustrations of various dexterous manipulators according to various exemplary embodiments of the present invention, the end effectors having various configurations in accordance with the inventive concept herein. In general, these end effectors are capable of providing or imparting forces in at least two directions, such as at least two opposing directions, similar to how a human hand can apply forces in different directions against an object. This multi-directional or opposing application of forces can be achieved in a variety of ways, or in other words, with a variety of different types of end effectors.

Figure 5A:
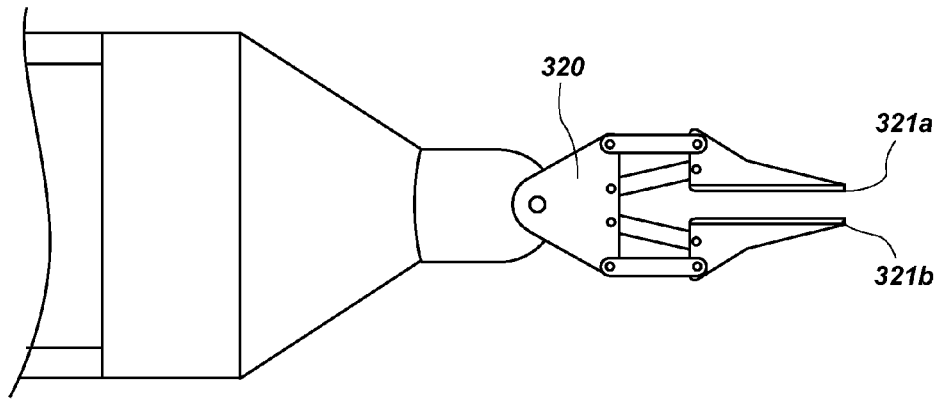
FIGS. 5a-h illustrate different types of dexterous manipulators in accordance with the present invention.

FIG. 5A shows an end effector 320 having a pair of counter opposing jaws 321a, 321b being able to apply opposing forces to an object or workpiece therein.

These jaws, as well as any embodiments described hereafter, may have a hardened grasping surface or a gripping surface to enhance functionality.

Additionally, the end effector 320 may comprise a magnetic grasping area and body. The magnetic components of the end effector may be equipped with controllable flux return path used to control the holding force of the magnets. By providing magnets to the end effector's body and grasping area the serpentine robotic crawler is enabled to more easily grasp ferromagnetic components. For example, a first dexterous manipulator may hold a steel screw or nail having ferromagnetic properties, and a second dexterous manipulator may be utilized to drive the screw or nail. By having a magnetic body or grasping area incorporated into the end effector 320 of the first dexterous manipulator the end effector 320 is less likely to drop the screw or nail and is better able to position the screw or nail for driving.

Additionally the magnetic body and grasping area allows the serpentine robotic crawler to better maneuver and manipulate items within environments having ferromagnetic properties. For example, many buildings have air supply ducts formed of ferromagnetic sheet metal where the serpentine robotic crawler may utilize magnets located on the end effector 320 to allow the serpentine robotic crawler to more easily climb within the duct.

Figure 5B:
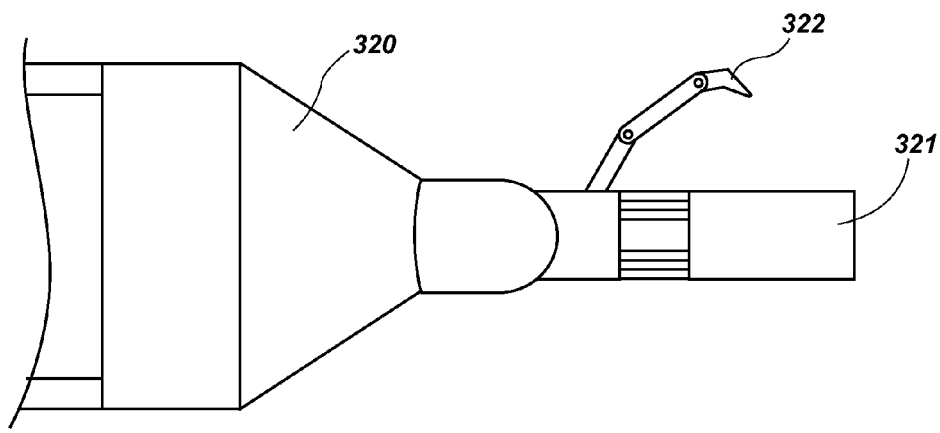

FIG. 5b shows the end effector 320 as further comprising an additional third jaw/thumb unit 322 operable with the pair of jaws 321 similar to those in FIG. 5a, with the thumb unit 322 being operable in a non-parallel plane from the clamping direction of the primary jaws 321.

Figure 5C:
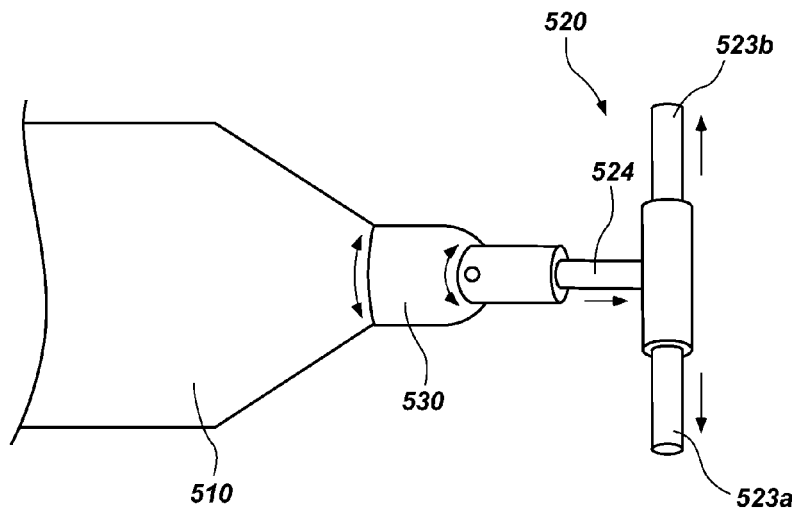

FIG. 5c shows an end effector 520 as comprising two rods 523a-b extendable in opposite directions, and a telescoping member 524 operable to extend and retract the two rods 523a, 523b toward and away from the rotational joint 530 and the jointed member 510. This type of end effector may be useful in confined spaces where an application of opposing forces against two opposing walls might prove beneficial, for example, while climbing or operating in a pipe.

Figure 5D:
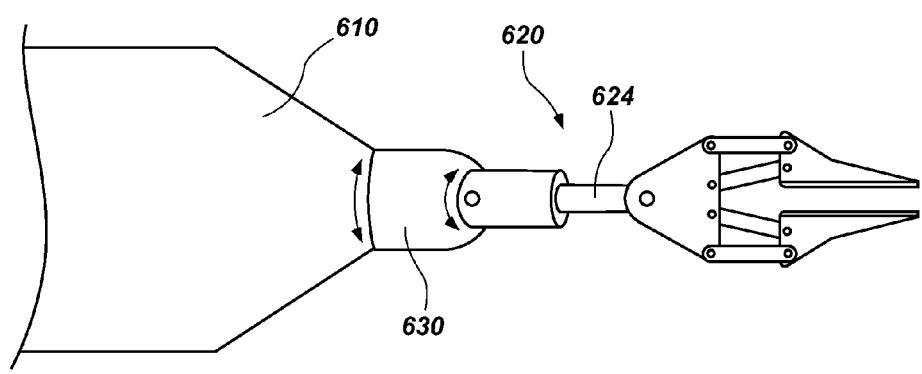

FIG. 5d shows the end effector 620 as comprising a telescoping member 624 able to telescope an end portion of the end effector 620 further away from the rotational joint 630 and the jointed member 610, thereby giving the dexterous manipulator still another degree of freedom.

Figure 5E:
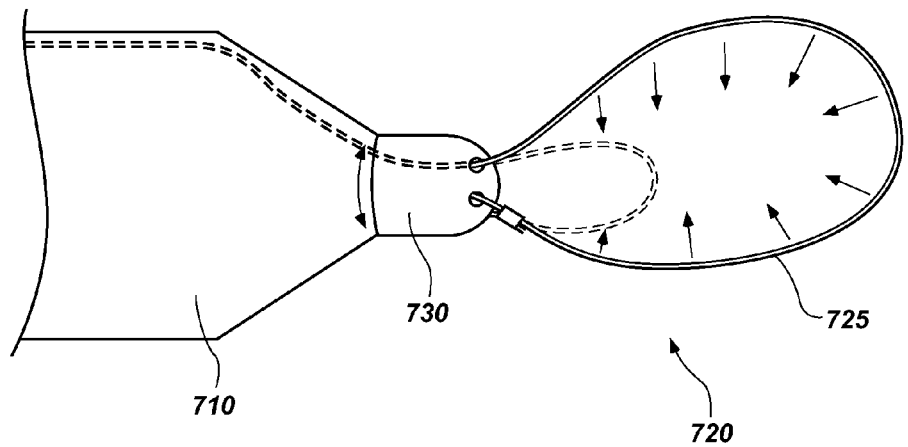

FIG. 5e shows the end effector 720 as comprising a retractable loop 725 operable about the rotational joint 730 and the jointed member 710. The retractable loop 725 can be configured to be capable of being looped around a work piece and constricted inwardly to grasp the workpiece. The retractable loop 725 can consist of a metal cable or other suitable type of material and design.

Figure 5F:
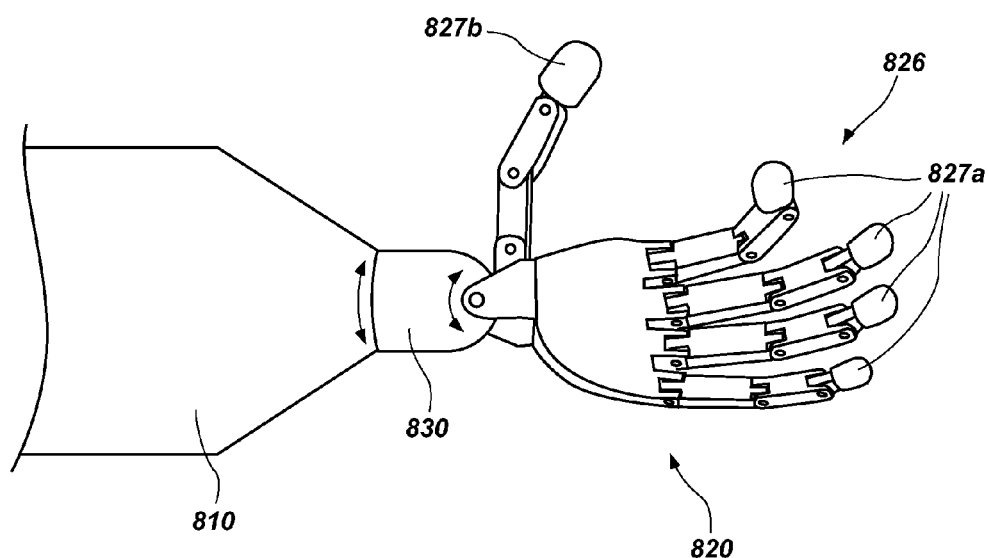

FIG. 5f shows a robotic hand 826 operable with the rotational joint 830 and the jointed member 810. The robotic hand 826 can comprise fingers 827a and an opposable thumb 827b.

Figure 5G:
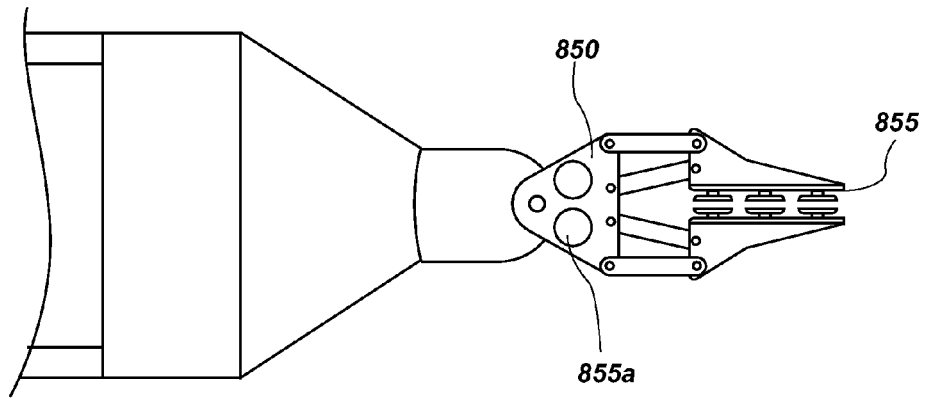

FIG. 5g shows a robotic end-effector 850 equipped with suction cups, such as pneumatic suction cups 855. The pneumatic suction cups 855 may be incorporated into the grasping area. Additional pneumatic suction cups 855a may also be incorporated onto the outer body of the end effector 850. The pneumatic suction cups 855 give the end effector 850 an enhanced ability to grasp or adhere to hard and substantially planar objects. Where a hard and smooth end effector may have trouble grasping items like metal or glass sheets, an end effector having pneumatic suction cups is able to easily grasp these objects. Further, pneumatic suction cups may also give the serpentine robotic crawler the ability to climb hard and smooth objects such as a metal beam or a glass window where other end effectors would not enable such and ability. It should be appreciated that other adhesion methods besides suction cups may be similarly employed to help the serpentine robotic crawler adhere to surfaces and items found in its environment. It may be appreciated that adhesives or other stick substances, for example microscopic texturing such as that found on a gecko's skin on its hands and feet may be similarly employed to allow the serpentine robotic crawler to "stick" to surfaces and items within its environment.

Figure 5H:
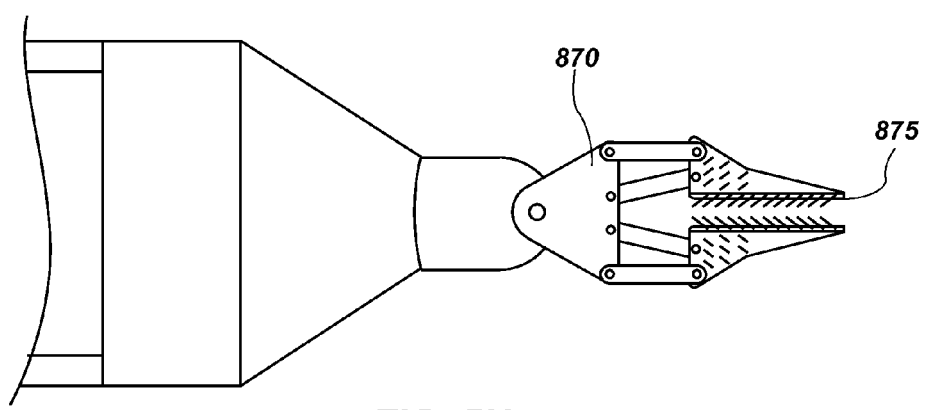

FIG. 5h shows a robotic end-effector 870 equipped with a textured surface 875 on the grasping area and about the end effector body which may facilitate grasping objects comprised of soft materials or having rough surfaces. The textured surface 875 may comprise a plurality of narrow hard cylinders or needles protruding from a flexible substrate, i.e. microspines. The flexible substrate allows the needles to have a small degree of flex while still allowing the needles to penetrate a soft material or enter into various surface features of a rough surface. The textured surface 875 may allow the end effector 870 to grasp smaller features on an object's surface where the item may be too large for end effector 320 to grasp the full object due to its size. For example, an end effector 870 having textured surface 875 may be able to better grasp a knot on a branch where the branch body is too large to grasp.

Additionally, the textured surface 875 allows grasping of items having rough surfaces where the needles are allowed to penetrate the texture of the item's surface. For example a brick, similar to the branch discussed above, may be too large for the end effector to grasp, however because the textured surface 875 can penetrate or be received within the texture of the brick's surface the end effector 870 may be allowed to grasp a corner or surface feature and manipulate the brick this way rather than being forced to have jaws sufficiently large to open the full width of the brick.

It should be appreciated that for each of the dexterous manipulators shown in FIGS. 5A-H each manipulator's features or functions may be combined with the features or functions of any other manipulator in any number of combinations as would be appreciated by one of ordinary skill in the art. The discussion with respect to any singular dexterous manipulator is not intended to be limited to only that specific dexterous manipulator and may be similarly applied to any and all dexterous manipulators discussed herein.

Figure 6:
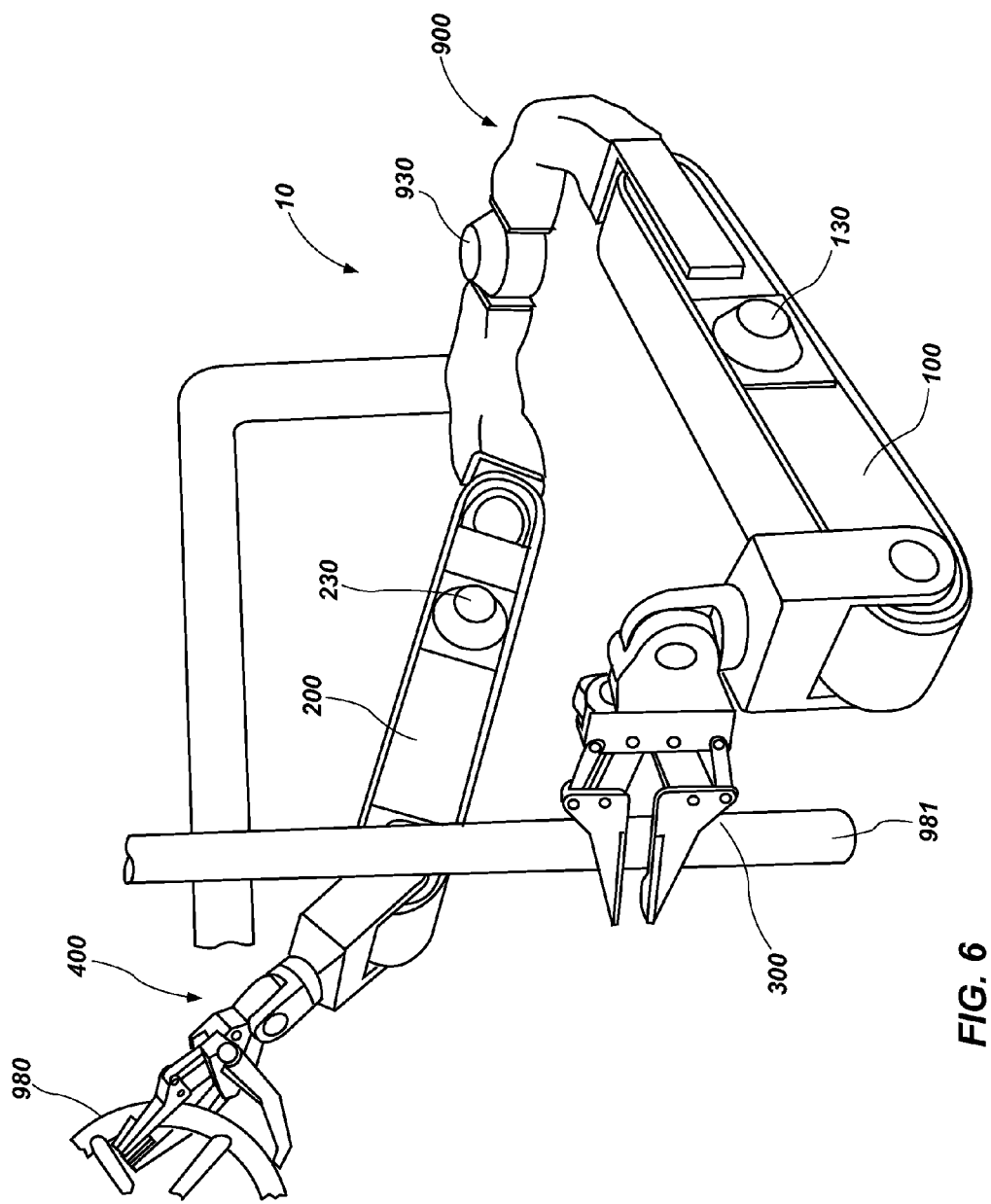
FIG. 6 illustrates a perspective view of an exemplary serpentine robotic crawler performing an exemplary two-handed dexterous operation in accordance with an embodiment of the present invention.
Figure 7:
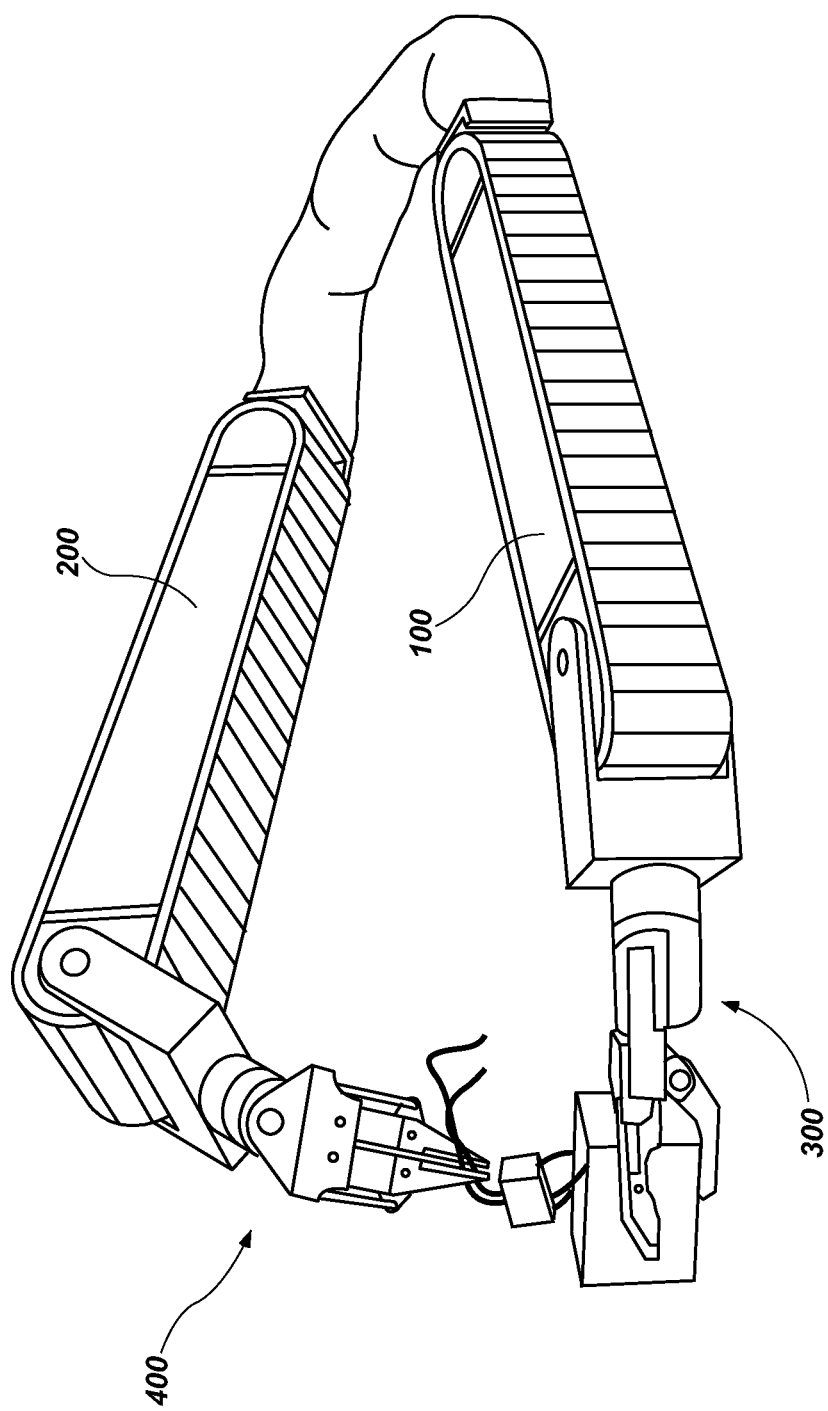
FIG. 7 illustrates a perspective view of an exemplary serpentine robotic crawler performing another exemplary two-handed dexterous operation in accordance with an embodiment of the present invention.

With reference to FIGS. 6 and 7, shown are serpentine robotic crawlers 10 having multiple dexterous manipulators (e.g., dexterous manipulators 300 and 400) performing coordinated dexterous operations. As shown, the two frames 100 and 200 are positionable via the articulated linkage 900 (shown as having a protective covering thereon, but see FIG. 1), where positioning of the frames 100 and 200 can thereby facilitate at least partial or high level positioning of the dexterous manipulators 300 and 400. Positioning the dexterous manipulators 300 and 400 into two different locations provides the serpentine robotic crawler 10 with the ability to perform a coordinated dexterous operation. This type of positioning allows the two dexterous manipulators 300 and 400 to perform, for example, independent functions to accomplish a given task. In one aspect, the functions may be identical, such where both dexterous manipulators grasp an object, such as an incendiary device for removal from an area. In another aspect, the functions may be different but related to a common task. For example, one dexterous manipulator 300 may grasp a bottle while the other dexterous manipulator 400 may grasp the lid and perform a twisting function to remove the lid for the purpose of opening the bottle. In still another aspect, the functions may be different and totally unrelated. For example, one dexterous manipulator 300 may be caused to type on a keyboard while the other dexterous manipulator 400 is caused to move an object or article on a desk.

With regards to the specific task illustrated in FIG. 6, the first dexterous manipulator 300 can be configured to grasp the stationary pipe 981 to provide a counter force to steady the robotic device as the second dexterous manipulator 400 is caused to manipulate (e.g., twist open or close) a valve key 980. It will be recognized that a dexterous operation, such as the twisting operation performed by the dexterous manipulator 400, may be carried out by the dexterous manipulator acting alone, or in another example, in concert or in conjunction with movement of the articulating linkage.

In examples such as those depicted in FIG. 6, the serpentine robotic crawler's ability perform a two handed function (grasp the key as well as grasp the stationary pipe) facilitates a highly beneficial coordinated counter force between dexterous manipulators. This is advantageous because, in reference to the valve key function depicted in FIG. 6, if the forces needed to twist or turn the valve key exceed the weight of the serpentine robotic crawler, the serpentine robotic crawler would likely be caused to move or displace out of position relative to the piping system rather than the valve key turning. By providing a coordinated dexterous operation with a second dexterous manipulator caused to grasp the stationary pipe and essentially anchor the serpentine robotic crawler in its appropriate operating position, the serpentine robotic crawler is able to apply much higher forces to the valve key without causing the serpentine robotic crawler to move out of position. The ability to utilize multiple dexterous manipulators in a coordinated manner gives the serpentine robotic crawler the ability to impart much higher force outputs and to perform tasks requiring much higher forces.

With regards to the specific task illustrated in FIG. 7, the first dexterous manipulator 300 can be configured to grasp an object as the second dexterous manipulator 400 performs dexterous manipulation on the object. It will be recognized that the dexterous operation, such as using a tool to perform a dexterous operation may be carried out by the dexterous manipulator acting alone, or in another example, in concert or in conjunction with movement of the articulating linkage.

Referring back to FIGS. 6 and 7, the serpentine robotic crawler 10 may further comprise one or more sensors. For example, optical sensors 130, 230, and 930, may be located on each of the frames 100 and 200 and in the articulating linkage 900 respectively. These sensors 130, 230, and 930 can be positionable such that they can observe the surroundings or environment, as well as the dexterous manipulators 200, and 300 and provide feedback regarding their orientation and function with respect to an operation, or with respect to each other. Indeed, the optical sensors can be configured to determine the spatial orientation of the first and second dexterous manipulators with respect to each other and a work piece, wherein the optical sensor can facilitate coordinated two-handed operations. The ability to see and appraise itself of its surroundings allows the serpentine robotic crawler 10 to be positioned in a desirable position, and to help grasp the items or perform an operation appropriately.

The depicted optical sensors 130, 230, and 930 are shown as having a stationary point of reference relative to the frame units, however telescoping, fiber-optic or other repositionable sensors (e.g., a moveable camera for viewing an area from a remote location) are also contemplated and intended to be within the scope of the present invention.

In addition to simply being positionable around a work piece, the various articulating systems of the serpentine robotic crawler 10, i.e. the multiple degree of freedom linkage arm and each of the dexterous manipulators can be configured to exert a force at least equal to the weight of the serpentine robotic crawler 10. These combined abilities can enable the serpentine robotic crawler to not only lift itself if needed, but to be able to perform more complex and high force dexterous operations, such as those shown in FIG. 6. i.e. twisting the valve key 980 while maintaining an operating position relative to the ground and piping system shown, or, as shown in FIG. 7, holding an object while performing a dexterous manipulation on this object. In some embodiments, the various articulating systems of the serpentine robotic crawler may be configured to exert forces that exceed the weight of the serpentine robotic crawler as some operations may require even higher forces, such as if the valve key 980 were rusted and more difficult to turn. High articulation forces also provides the ability for the serpentine robotic crawler 10 to move in dynamic modes or patterns (e.g., swinging or climbing, etc.).

Figures 8A, 8B:
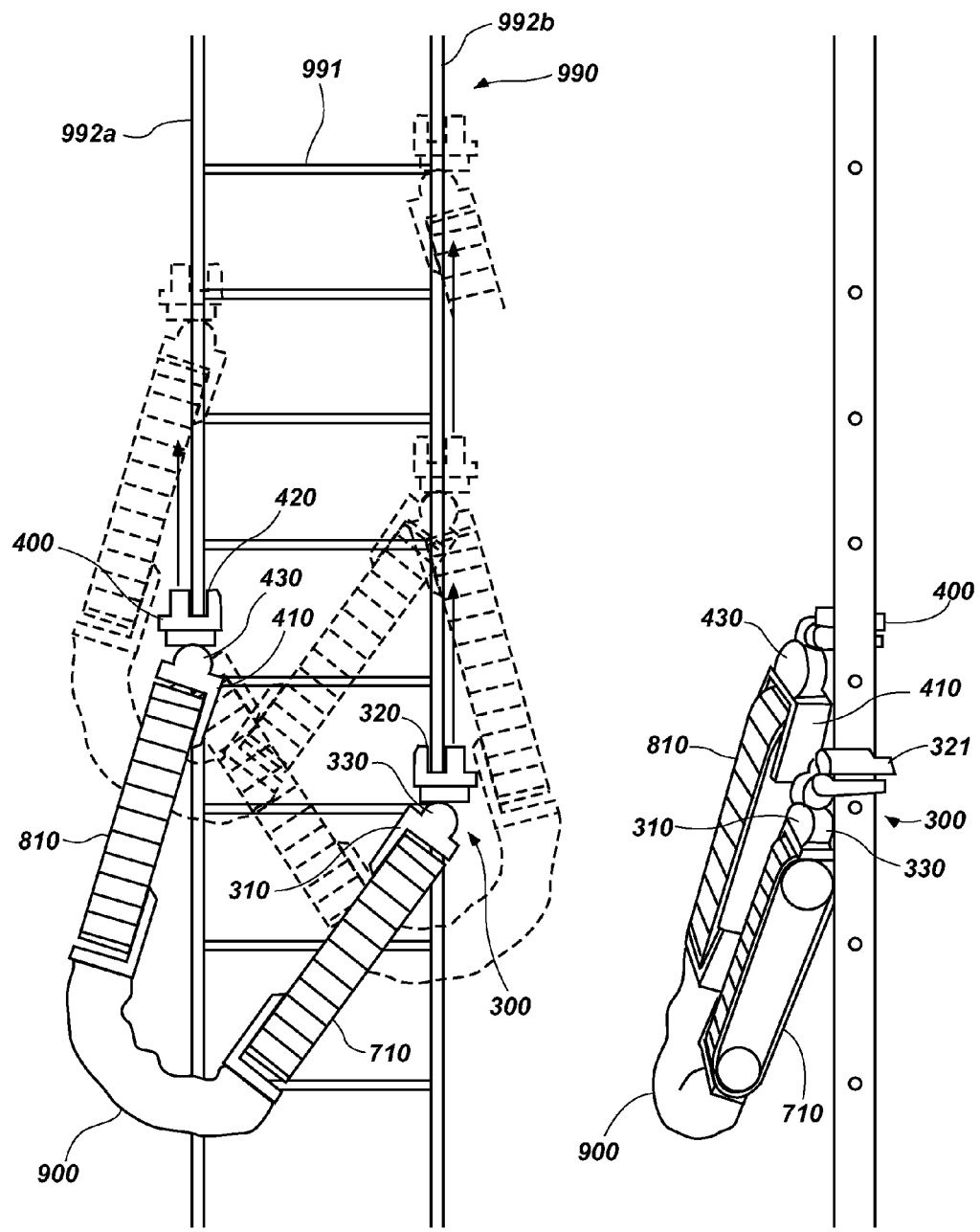
FIGS. 8a and 8b illustrate perspective views of an exemplary serpentine robotic crawler performing a different exemplary dexterous operation in accordance with an embodiment of the present invention.

With reference to FIGS. 8a and 8b, shown is an illustration of a serpentine robotic crawler 10 with dexterous manipulators 300 and 400 operating in a coordinated manner, each performing a dexterous operation of grasping various parts of a ladder 990, to accomplish the task of climbing the ladder 990. This task involves using the dexterous manipulators 300 and 400 to grasp the ladder 990, then by articulating the articulated linkage 900, the jointed members 310, 410, and the rotational joints 330, 430, as well as alternating the end effector clamping mechanisms 320 and 420, the serpentine robotic crawler 10 can be caused to climb up the ladder 990. In this example, the serpentine robotic crawler is shown as grasping the side rails 992a-b of the ladder 990. However, the serpentine robotic crawler 10 could also be caused to climb the ladder by using the dexterous manipulators 300, 400 to grasp the individual rungs 991. This example further illustrates the benefits of having a serpentine robotic crawler 10 with multiple dexterous manipulators able to perform individual dexterous operations, while also operating in a coordinated manner. This method of climbing also illustrates some of the advantages for having end effectors 320 and 420 able to clamp with high force. Indeed, as the serpentine robotic crawler 10 is not intended to be stationary in this example, the various components of the serpentine robotic crawler can be configured to be able to support the entire weight of the robot during such dynamic motions while extending itself from one clamping point to the next. Those skilled in the art will recognize that the discussion above with respect to climbing a ladder is intended to be merely exemplary of the many different types of objects or obstacles the robotic crawler 10 can climb or manipulate. Indeed, the serpentine robotic crawler 10 is capable of climbing or scaling other structures, such as a chain link fence, wherein the robotic crawler can grasp the fence at different locations using the dexterous manipulators 300 and 400 in a similar manner as would be done in climbing the ladder.

Figure 9:
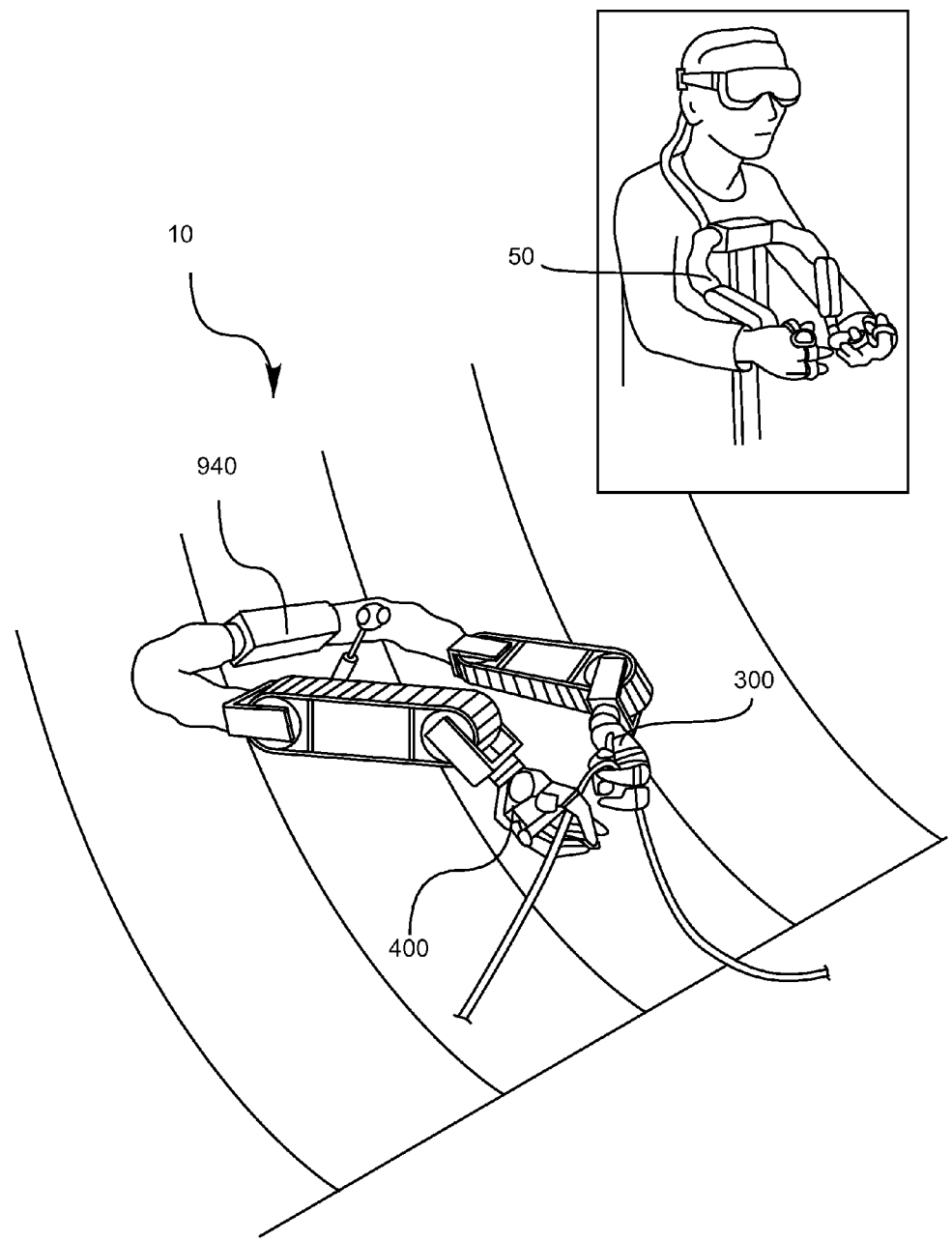
FIG. 9 illustrates a perspective view of en exemplary serpentine robotic crawler held to an object by a device attached to its articulated section facilitating two-handed dexterous operation, in accordance with and embodiment of the present invention.

With reference to FIG. 9, shown is an illustration of serpentine robotic crawler 10 comprising frame units and dexterous manipulators 300, 400 held to an object (e.g. to a ferromagnetic material wall) by a clamping device 940 (e.g. suction cups, gripper, or magnetic clamp, such as an electromagnet or permanent magnets with variable flux return path to control the clamping force). As described herein, the serpentine robotic crawler 10 can perform single or two-handed dexterous operations.

Also shown in FIG. 9 is an embodiment of a possible operator control input device comprised of a small replica of the serpentine robotic crawler referred hereinafter as a replica master 50. By manipulating the joints of the replica master 50 the user may then remotely control each of the corresponding joints of the serpentine robotic crawler.

This replica master may be equipped with passive joints with joint position sensors, joints equipped with brakes or locking mechanisms used to provide partial force feedback (i.e. it can provide forces that oppose those applied by the remotely located operator), or actuated joints to provide complete force feedback to the remotely located operator. By providing force feedback through these joints, the user may be provided some idea of the force being applied by the serpentine robotic crawler. This feedback may be particularly useful when the serpentine robotic crawler is being utilized for grasping a sensitive object that the user does not wish to crush.

With respect to FIGS. 10-13, shown are exemplary alternative embodiments of serpentine robotic crawlers having dexterous manipulators which deploy laterally from their respective frame units.

Figure 10:
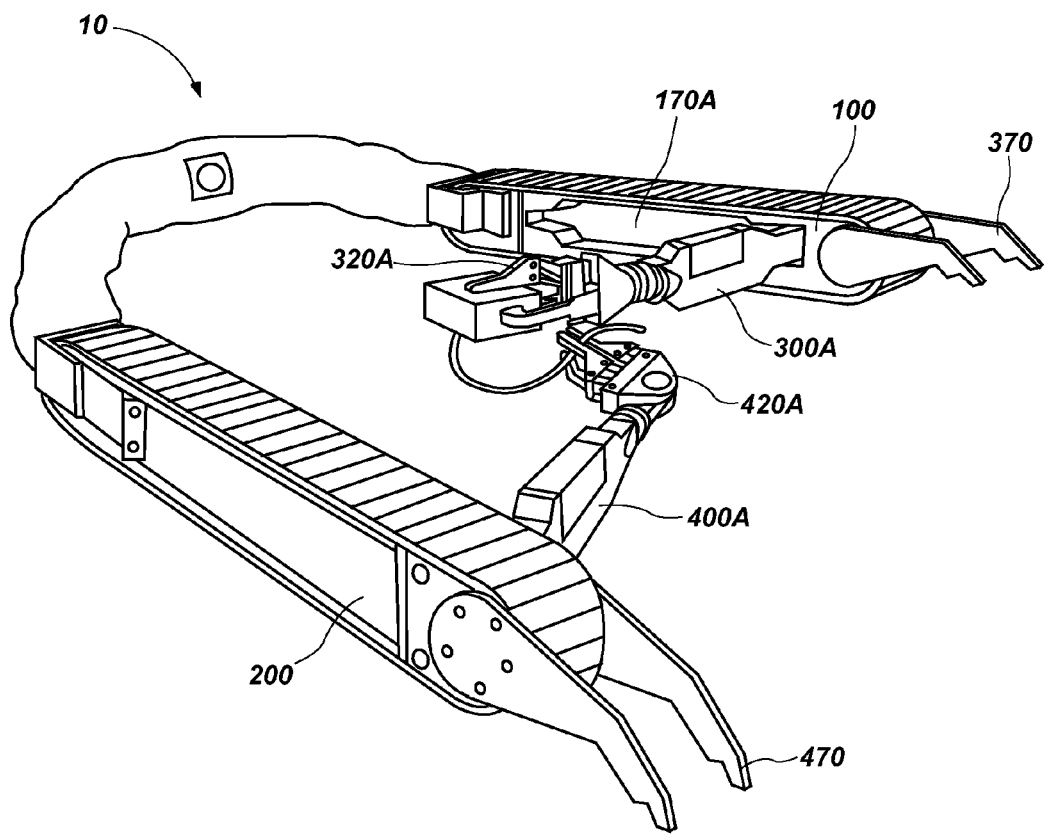
FIGS. 10-13 illustrate perspective views of a serpentine robotic crawler having alternative embodiments of the dexterous manipulators wherein the dexterous manipulators deploy laterally from their respective frames from within lateral cavities within the frames.

In particular reference to FIG. 10, shown is a serpentine robotic crawler 10 having two frame units 100 and 200, wherein the dexterous manipulators 300A and 400A each deploy out of lateral cavities formed in or otherwise associated with the frame units 100 and 200, respectively. Specifically, dexterous manipulator 300A can deploy from lateral cavity 170A of frame unit 100, and dexterous manipulator 400A can deploy from a similar cavity (not shown) of frame unit 200. Having laterally deployable dexterous manipulators allows the serpentine robotic crawler to surround a work piece and offer a more stable platform from which the respective dexterous manipulators 300A and 400A can be positioned to utilize their respective end effectors 320A and 420A to manipulate a work piece. As shown, in one embodiment, the dexterous manipulators 300A and 400A can each deploy about a hinge operable with the respective frame units 100 and 200, wherein the dexterous manipulators 300A and 400A can pivot or swing outward from the respective frame units to a desired position. Each respective frame may further include an optional extender unit, for example extender unit 370 located at a distal end of frame unit 100 and extender unit 470 located about distal end of frame unit 200. These extender units may be used for any number of functions including, but not limited to, improved or assisted locomotion, stabilizing of the frame units, grasping of additional objects, or merely providing an enlarged base footprint for its respective frame.

Figure 11:
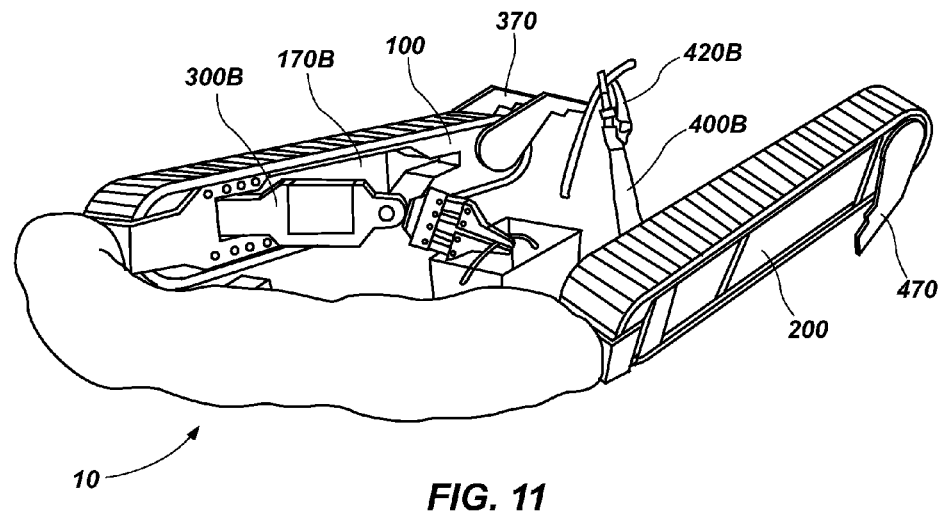

In particular reference to FIG. 11, shown is a serpentine robotic crawler 10 having two frame units 100 and 200, wherein the dexterous manipulators 200B and 400B also deploy from lateral cavities located within their respective frame units. Dexterous manipulator 300B can be configured to deploy from cavity 170B and dexterous manipulator 400B can be configured to deploy from a similar cavity located within frame 200. While this embodiment is similar to that shown in FIG. 10, the hinge about which each of the dexterous manipulators deploys is instead located at an opposite end of each respective frame. Also similar to the embodiment of FIG. 10, the embodiment of FIG. 11 provides the serpentine robotic crawler 10 the ability to surround a work piece and laterally deploy the dexterous manipulators 300B and 400B to position the respective end effectors 320B and 420B to act on the work piece. It should be noted that the embodiment as shown also provides for the use of extender units 370 and 470. However, as discussed above, these extender units can be optional, and included to provide additional functionality to the serpentine robotic crawler 10.

Figure 12:
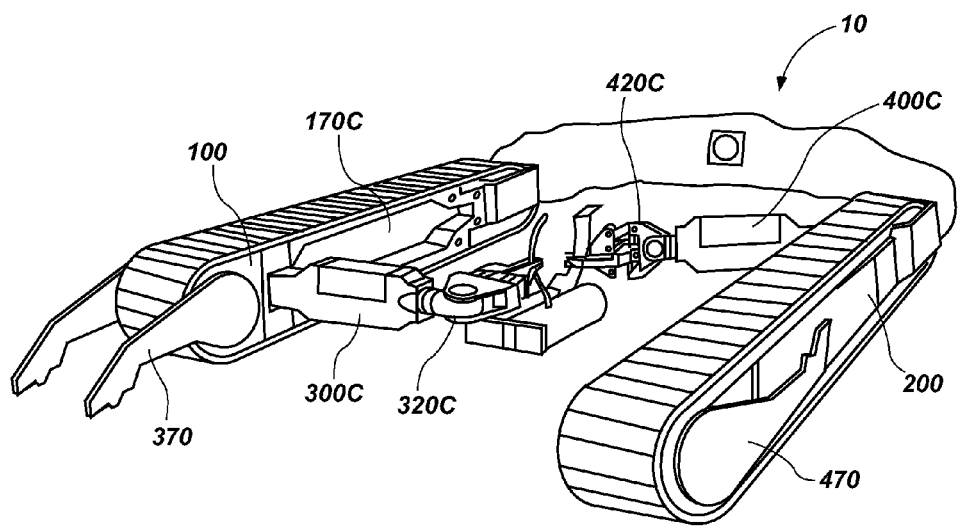

In particular reference to FIG. 12, shown is another embodiment similar to the embodiments shown if FIGS. 10 and 11. However, this embodiment depicts an alternative configuration, wherein the serpentine robotic crawler has two frames 100 and 200, and wherein the deployment directions of the respective dexterous manipulators 300C and 400C along with their respective end effectors 320C and 420C are different from one another, meaning that the dexterous manipulators are deployed from different respective ends of the frame units. In one embodiment, the deployment dexterous manipulator 300C can be deployed from cavity 170C about a hinge located about a distal end of frame unit 100, and the second dexterous manipulator 400C can be deployed about a hinge located about a proximal end of frame unit 200. From this, it can be seen that the extender units 370 and 470 may be utilized or alternatively retracted to a low profile position depending on the needs of a given situation or workpiece.

Figure 13:
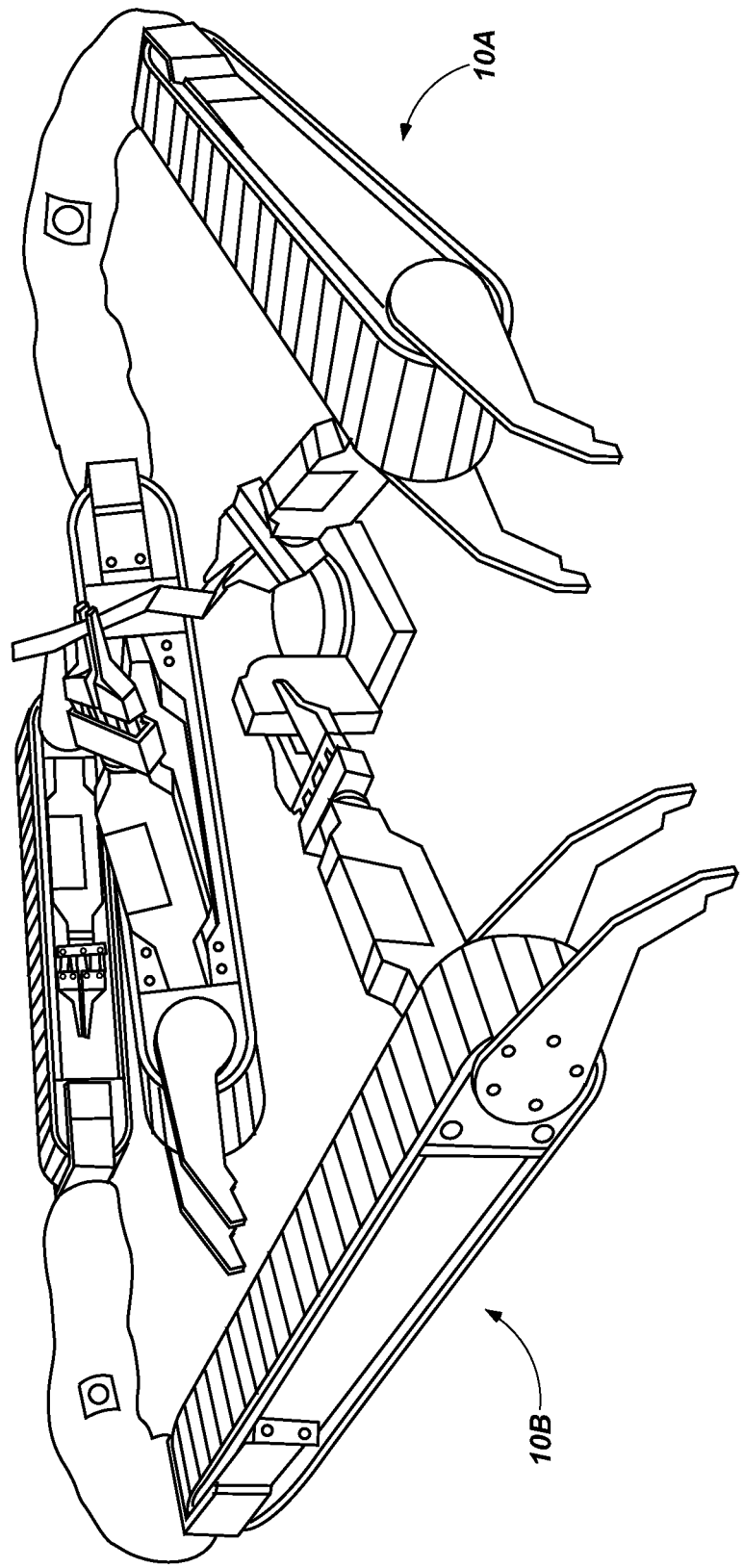

FIG. 13 depicts how two serpentine robotic crawlers 10A and 10B may be used in concert to provide more than two dexterous manipulators given a particular situational need.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A serpentine robotic crawler, comprising:
   at least one frame;
   at least one dexterous manipulator supported about the frame, the dexterous manipulator comprising:
     a jointed member moveable about at least one degree of freedom, and an end effector moveable by the jointed member,
   wherein the dexterous manipulator is moveable in at least two degrees of freedom, and facilitates performance of a dexterous operation;
   a second frame;
   an articulating linkage coupling the at least one frame and the second frame, the articulating linkage having at least one articulating joint; and
   a second dexterous manipulator supported about the second frame and moveable within at least two degrees of freedom to facilitate a dexterous operation,
   wherein the at least one dexterous manipulator and the second dexterous manipulator perform individual dexterous operations that are coordinated with one another.

2. The serpentine robotic crawler of claim 1, wherein the dexterous manipulator exerts a force in excess of the weight of the serpentine robotic crawler.

3. The serpentine robotic crawler of claim 1, wherein the jointed member and the end effectors each are moveable in at least one degree of freedom, and wherein the jointed member and the end effectors exert a force in excess of the weight of the serpentine robotic crawler in their respective degree of freedom.

4. The serpentine robotic crawler of claim 1, wherein the dexterous manipulator is supported about an end of the frame.

5. The serpentine robotic crawler of claim 1, wherein the frame has an uppermost surface defining an upper plane and a lowermost surface defining a lower plane, and wherein the dexterous manipulator is position able to fit completely between the upper and lower planes.

6. The serpentine robotic crawler of claim 1, wherein the second dexterous manipulator comprises a jointed member moveable about at least one degree of freedom, and an end effecter moveable by the jointed member.

7. The serpentine robotic crawler of claim 1, further comprising an actuator system operable to actively articulate the at least one articulating joint of the articulating linkage, and the dexterous manipulator.

8. The serpentine robotic crawler of claim 1, further comprising at least one optical sensor configured to determine the spatial orientation of the first and second dexterous manipulators with respect to each other and a work piece, wherein the optical sensor facilitates coordinated two-handed operations.

9. The serpentine robotic crawler of claim 1, wherein the dexterous operation of the dexterous manipulator is coordinated with the dexterous operation of the second dexterous manipulator to perform a task.

10. The serpentine robotic crawler of claim 1, further comprising at least one electromagnet formed into an end effecter of at least one of the first and second dexterous manipulators.

11. The serpentine robotic crawler of claim 1, further comprising at least one textured surface supported about at least one of the first and second dexterous manipulators.

12. The serpentine robotic crawler of claim 1, further comprising a plurality of pneumatic suction cups supported about at least one of the first and second dexterous manipulators.

13. The serpentine robotic crawler of claim 1, further comprising a ground contacting element selected from the group consisting of an endless track, a wheel, and any combination of these.

14. A serpentine robotic crawler, comprising:
a first frame having a distal end, a proximal end, and a drive subsystem operable therewith;
a second frame having a distal end, a proximal end, and a second drive subsystem operable therewith;
an articulating linkage coupling the first and second frames together about their respective proximal ends, the articulating linkage having at least one actuated joint; and
a dexterous manipulation system comprising:
a dexterous manipulator supported about the distal end of each of the first and second frames;
a control system supported about one of the first and second frames for controlling the dexterous manipulators,
wherein the dexterous manipulators perform individual dexterous operations that are coordinated with one another.

15. The serpentine robotic crawler of claim 14, further comprising at least one optical sensor configured to ascertain the spatial orientation of the dexterous manipulators with respect to each other and capable of sensing the spatial orientation of the dexterous manipulators with respect to a work piece.

16. The serpentine robotic crawler of claim 14, wherein each frame has an uppermost surface defining an upper plane and a lowermost surface defining a lower plane, wherein the dexterous manipulator is positionable to fit completely between the upper and lower planes.

17. The serpentine robotic crawler of claim 14, wherein the drive subsystems operable with the first and second frames comprise an endless track.

18. A method for facilitating dexterous operation within a serpentine robotic crawler, the method comprising:
providing a frame having a drive subsystem;
configuring the drive subsystem to provide locomotion to the frame;
supporting a dexterous manipulator about the frame, the dexterous manipulator comprising a jointed member, a rotational joint, and an end effector supported about the jointed member;
configuring the jointed member to move in at least one degree of freedom;
configuring the rotational joint to move in at least one degree of freedom different from that of the jointed member;
configuring the end effector to apply a first force in a first direction, and a second force in a second direction;
providing a second frame having a second drive subsystem;
coupling the first and second frames together via an articulating linkage having at least one actuated joint;
supporting a second dexterous manipulator about the second frame, the second dexterous manipulator comprising a second jointed member, and a second end effector supported about the second jointed member;
configuring the second jointed member to move in at least one degree of freedom;
configuring the first and second jointed members and the first and second end effectors to perform individual dexterous operations in a coordinated manner.

19. The method of claim 18, further comprising:
providing at least one actuator system capable of articulating the jointed member and the dexterous manipulator; and
configuring the at least one actuator system to provide a force at least equal to the weight of the entire crawler.

20. The method of claim 18, further comprising configuring the dexterous manipulator to fit within an upper plane and a lower plane defined by uppermost and lowermost surfaces of the frame.

21. The method of claim 18, further comprising:
providing at least one optical sensor; and
configuring the at least one optical sensor to ascertain the spatial orientation of the dexterous manipulator with respect to the frame and the spatial orientation of the dexterous manipulator with respect to a work piece.

22. The method of claim 21, further comprising:
configuring the second drive subsystem to provide locomotion to the second frame;
configuring the second end effector to apply different forces in different directions.

23. The method of claim 22, further comprising:
providing at least one actuation system on each of the first and second frames configured to cause respective articulation of the first and second jointed members and respective articulation of the first and second end effectors supported about the first and second jointed members;
providing an additional actuation system configured to articulate the articulated linkage; and
configuring the articulated linkage to orient the first and second frames into two different vectors.

24. The method of claim 18, further comprising a magnet operable with at least one of the first and second dexterous manipulators.

25. The method of claim 18, further comprising configuring at least one of the first and second dexterous manipulators with one or more suction cups.

26. The method of claim 18, further comprising configuring at least one of the first and second dexterous manipulators to have a textured surface including microspines.

* * * * *